(12) United States Patent
Ohmori

(10) Patent No.: US 12,403,397 B2
(45) Date of Patent: Sep. 2, 2025

(54) STORAGE MEDIUM, INFORMATION PROCESSING SYSTEM, INFORMATION PROCESSING APPARATUS, AND GAME PROCESSING METHOD

(71) Applicants: Nintendo Co., Ltd., Kyoto (JP); The Pokémon Company, Tokyo (JP)

(72) Inventor: Shigeru Ohmori, Tokyo (JP)

(73) Assignees: Nintendo Co., Ltd., Kyoto (JP); The Pokémon Company, Tokyo (JP)

( * ) Notice: Subject to any disclaimer, the term of this patent is extended or adjusted under 35 U.S.C. 154(b) by 433 days.

(21) Appl. No.: 18/116,023

(22) Filed: Mar. 1, 2023

(65) Prior Publication Data
US 2024/0058701 A1    Feb. 22, 2024

(30) Foreign Application Priority Data
Aug. 16, 2022    (JP) .................... 2022-129632

(51) Int. Cl.
*A63F 13/56* (2014.01)
*A63F 13/42* (2014.01)

(52) U.S. Cl.
CPC ............. *A63F 13/56* (2014.09); *A63F 13/42* (2014.09)

(58) Field of Classification Search
CPC ........ A63F 13/56; A63F 13/42; A63F 13/825; A63F 13/422; A63F 13/424; A63F 13/428; A63F 13/57; A63F 13/573; A63F 13/577
See application file for complete search history.

(56) References Cited

U.S. PATENT DOCUMENTS 6,354,940 B1    3/2002 Itou et al.
6,419,584 B1*   7/2002 Sakamoto ............. A63F 13/822
                                                    463/43

(Continued)

FOREIGN PATENT DOCUMENTS

JP    3825201    7/2006
JP    5841112    11/2015

(Continued)

OTHER PUBLICATIONS

"Pokemon RPGs 101", [online], The Pokemon Company, [searched on Jul. 18, 2022], internet<https://www.pokemon.com/us/strategy/pokemon-rpgs-101/>.

*Primary Examiner* — David L Lewis
*Assistant Examiner* — Matthew D Hoel
(74) *Attorney, Agent, or Firm* — Nixon & Vanderhye PC

(57) ABSTRACT

An example of an information processing system moves a player character on a field, based on a movement operation input. The information processing system causes a sub character on the field, based on a first operation input. When an enemy character is placed at a location where the sub character is caused to appear, the information processing system controls a battle by a first mode in which the battle proceeds based on an operation input. When the enemy character is not placed at the location, the information processing system starts automatic control of automatically moving the sub character. The information processing system moves the sub character, based on a second operation input, and when the enemy character is placed at a location of a designation, the information processing system controls a battle by a second mode in which the battle automatically proceeds.

26 Claims, 22 Drawing Sheets

(56) References Cited

U.S. PATENT DOCUMENTS

| | | | |
|---|---|---|---|
| 9,956,481 B2* | 5/2018 | Hisaoka | A63F 13/814 |
| 10,220,322 B2* | 3/2019 | Tanaka | A63F 13/42 |
| 11,446,579 B2* | 9/2022 | Kim | A63F 13/92 |
| 11,559,739 B2* | 1/2023 | Motokura | A63F 13/44 |
| 11,638,874 B2* | 5/2023 | Lutz | A63F 13/537 |
| | | | 463/31 |
| 12,023,587 B2* | 7/2024 | Abe | A63F 13/58 |
| 2003/0109299 A1* | 6/2003 | Reizei | A63F 13/822 |
| | | | 463/11 |
| 2004/0143852 A1* | 7/2004 | Meyers | A63F 13/822 |
| | | | 463/43 |
| 2005/0054402 A1* | 3/2005 | Noguchi | A63F 13/10 |
| | | | 463/5 |
| 2011/0151976 A1* | 6/2011 | Holloway | A63F 13/63 |
| | | | 463/42 |
| 2011/0312395 A1* | 12/2011 | Nakamura | A63F 13/828 |
| | | | 463/4 |
| 2013/0225286 A1* | 8/2013 | Ikeda | A63F 3/00643 |
| | | | 463/31 |
| 2017/0239570 A1* | 8/2017 | Iguchi | A63F 13/35 |
| 2020/0061474 A1 | 2/2020 | Ohashi et al. | |
| 2021/0001226 A1 | 1/2021 | Suzuki et al. | |
| 2022/0152502 A1* | 5/2022 | Abe | A63F 13/56 |
| 2023/0191255 A1 | 6/2023 | Iwao | |
| 2023/0390643 A1 | 12/2023 | Bunnell et al. | |
| 2024/0058701 A1* | 2/2024 | Ohmori | A63F 13/825 |

FOREIGN PATENT DOCUMENTS

| | | |
|---|---|---|
| JP | 7127777 | 8/2022 |
| JP | 2023-098552 | 7/2023 |
| JP | 7373472 | 10/2023 |
| JP | 7398425 | 12/2023 |

* cited by examiner

STORAGE MEDIUM, INFORMATION PROCESSING SYSTEM, INFORMATION PROCESSING APPARATUS, AND GAME PROCESSING METHOD

CROSS REFERENCE TO RELATED APPLICATION

This application claims priority to Japanese Patent Application No. 2022-129632, filed on Aug. 16, 2022, the entire contents of which are incorporated herein by reference.

FIELD

The present disclosure relates to a storage medium, an information processing system, an information processing apparatus, and a game processing method for executing a game in which a plurality of characters battle with each other.

BACKGROUND AND SUMMARY

Conventionally, as for a game in which a plurality of characters battle with each other, a technique of progressing a battle by causing a character to perform a motion corresponding to a command designated by a player, has been known.

During such a game, if, in addition to a battle by a method in which commands are used, a battle by another method is enabled, variations of battle can be increased.

Therefore, the present application discloses a storage medium, an information processing system, an information processing apparatus, and a game processing method that enable battles in a game to be performed by a plurality of methods.

(1)

An example of a non-transitory computer-readable storage medium described herein a game program. The game program causing a processor of an information processing apparatus to execute: performing control of moving a player character on a field in a virtual space, based on a movement operation input; performing control of causing a sub character to appear on the field, based on a first operation input, and (a) when an enemy character is placed at a location where the sub character is caused to appear, controlling a battle between the sub character and the enemy character by a first mode in which the battle proceeds based on an operation input, and (b) when the enemy character is not placed at the location where the sub character is caused to appear, starting automatic control of automatically moving the sub character that has appeared; and performing control of moving the sub character in a predetermined direction on the field, based on a second operation input, and, when the enemy character is placed at a location of a designation, controlling a battle between the sub character and the enemy character by a second mode in which the battle automatically proceeds.

According to the configuration of the above (1), the player can be allowed to perform two types of battles, that is, a battle by the first mode in which the player performs an operation input and a battle by the simpler second mode.

(2)

The game program may further cause the processor to start the automatic control after the battle by the second mode ends.

According to the configuration of the above (2), since the sub character moves under automatic control even without the player making any instruction after the battle by the second mode ends, the time and effort for an operation by the player can be omitted.

(3)

In the configuration of the above (1) or (2), the game program may further cause the processor to, if another enemy character is placed in a predetermined range including a position of the sub character when the battle between the sub character and the enemy character by the second mode ends, start a battle between the sub character and the other enemy character by the second mode.

According to the configuration of the above (3), since the player does not have to repeatedly perform the second operation input when causing an automatic battle to be performed with a plurality of enemy characters, the operability of the operation for the sub character can be improved.

(4)

In the configuration of the any one of above (1) to (3), the automatic control may include movement control of causing the sub character to follow the player character.

According to the configuration of the above (4), the sub character can be easily placed near the player character, so that the player can easily confirm the behavior of the sub character.

(5)

In the configuration of the any one of above (1) to (4), the game program may further cause the processor to perform control of bringing the sub character into a state where the sub character has not appeared on the field, when a third operation input is performed in a state where the sub character has appeared.

According to the configuration of the above (5), the player can freely switch between a state where the sub character has appeared on the field and a state where the sub character has not appeared on the field.

(6)

In the configuration of the any one of above (1) to (5), the game program may further cause the processor to, when the player character comes into contact with the enemy character, control a battle between the sub character and the enemy character by the first mode regardless of whether or not the sub character has appeared on the field.

According to the configuration of the above (6), the player can easily start a battle by the first mode both when the sub character has appeared on the field and when the sub character has not appeared on the field.

(7)

In the configuration of the any one of above (1) to (6), the game program may cause the processor to perform control of moving the sub character toward a predetermined position set in front of the player character, when the second operation input is performed.

According to the configuration of the above (7), the sub character can be moved to the position designated by the player.

(8)

In the configuration of the above (7), the game program may cause the processor to perform control of causing the sub character to appear on the field and moving the sub character toward the predetermined position, when the second operation input is performed in a state where the sub character has not appeared on the field.

According to the configuration of the above (8), since the player can cause the sub character to both appear and move to the predetermined position by the second operation input, the operability of the operation for the sub character can be improved.

(9)

In the configuration of the any one of above (1) to (8), the game program may further cause the processor to: select one of enemy characters on the field, based on a fourth operation input; when the first operation input is performed in a state where the enemy character is selected, perform control of causing the sub character to appear at a location where the selected enemy character is placed, and control a battle between the sub character and the selected enemy character by the first mode; and when the second operation input is performed in a state where the enemy character is selected, perform control of moving the sub character toward the selected enemy character on the field, and control a battle between the sub character and the selected enemy character by the second mode.

According to the configuration of the above (9), the player can easily designate an enemy character to be an opponent in a battle by the fourth operation input.

(10)

In the configuration of the any one of above (1) to (9), in a battle by the first mode, a plurality of commands including at least an attack by the sub character on the enemy character and capture of the enemy character may be designated based on an operation input, and motions of the player character and/or the sub character corresponding to the designated commands may be executed.

According to the configuration of the above (10), since the enemy character can be captured through the battle by the first mode, motivation to perform the battle by the first mode can be given to the player.

(11)

In the configuration of the above (10), a battle by the first mode may be started after display control of moving a viewpoint such that the sub character and the enemy character that perform the battle are included at least in a field of view, without switching a scene on the field. Movement of the player character may be limited during the battle.

According to the configuration of the above (11), the player is allowed to easily recognize that the battle by the first mode has been started.

(12)

In the configuration of the above (11), a battle by the second mode may be started without switching the scene on the field. Movement control of the player character based on the movement operation input may be executed during the battle.

According to the configuration of the above (12), the player can cause the sub character to perform the battle by the second mode while moving the player character.

In the present specification, examples of an information processing apparatus and an information processing system for executing the processes in the above (1) to (12) are disclosed. Moreover, in the present specification, an example of a game processing method for executing the processes in the above (1) to (12) is disclosed.

According to the storage medium, the information processing system, the information processing apparatus, or the game processing method, battles in the game can be performed by a plurality of methods.

These and other objects, features, aspects and advantages of the exemplary embodiment will become more apparent from the following detailed description when taken in conjunction with the accompanying drawings.

DETAILED DESCRIPTION OF NON-LIMITING EXAMPLE EMBODIMENTS

1. Configuration of Game System

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
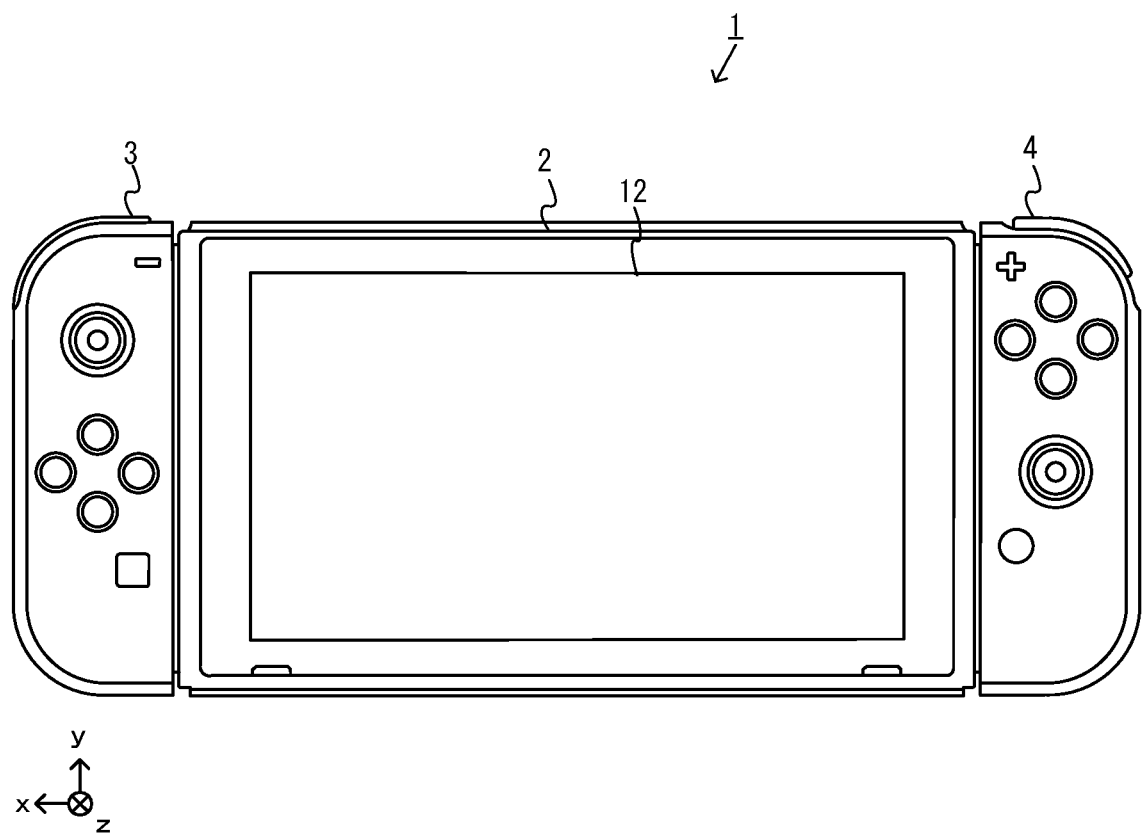
FIG. 1 is a view showing an example where a non-limiting left controller and a non-limiting right controller are attached to a non-limiting main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
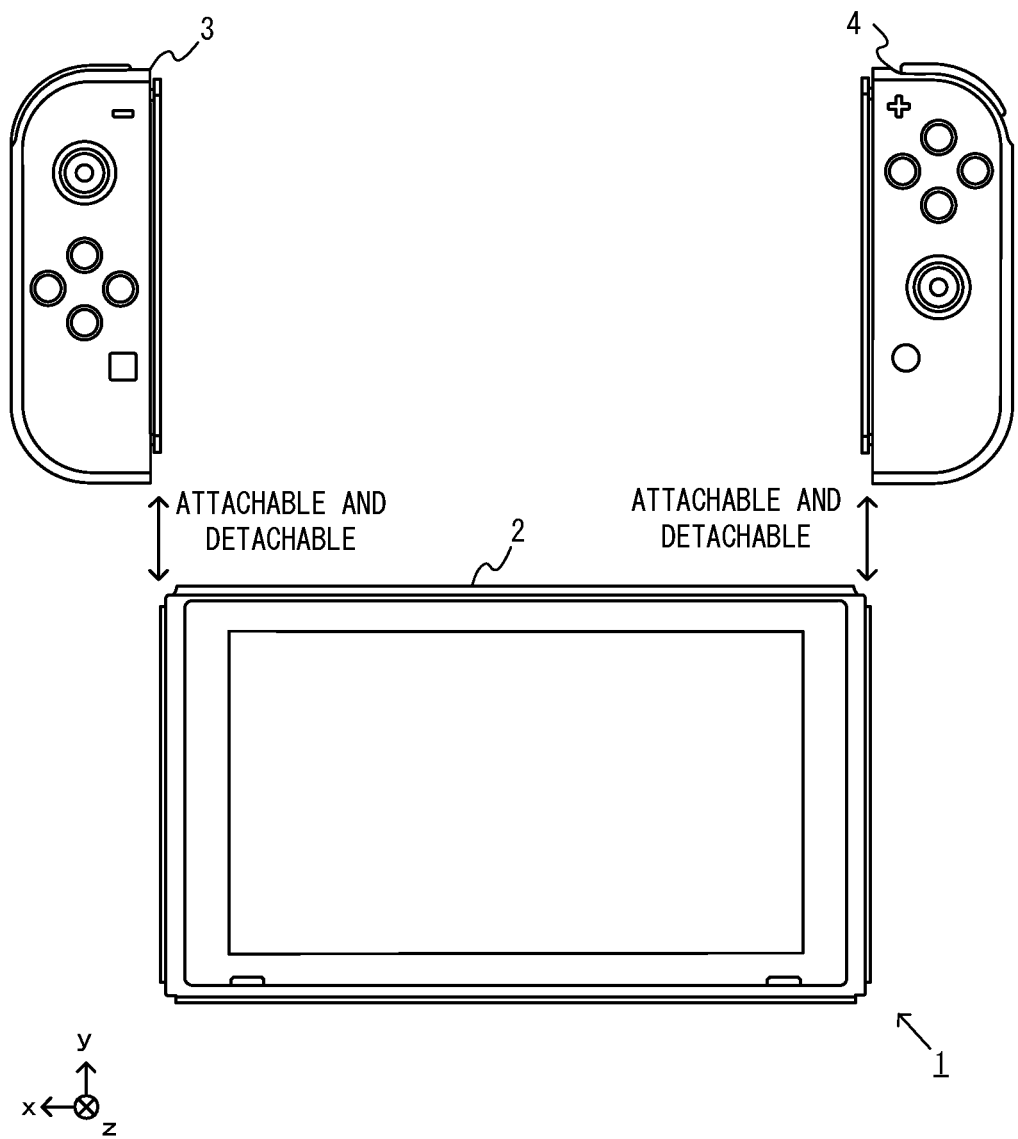
FIG. 2 is a view showing an example where a non-limiting left controller and a non-limiting right controller are removed from a non-limiting main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
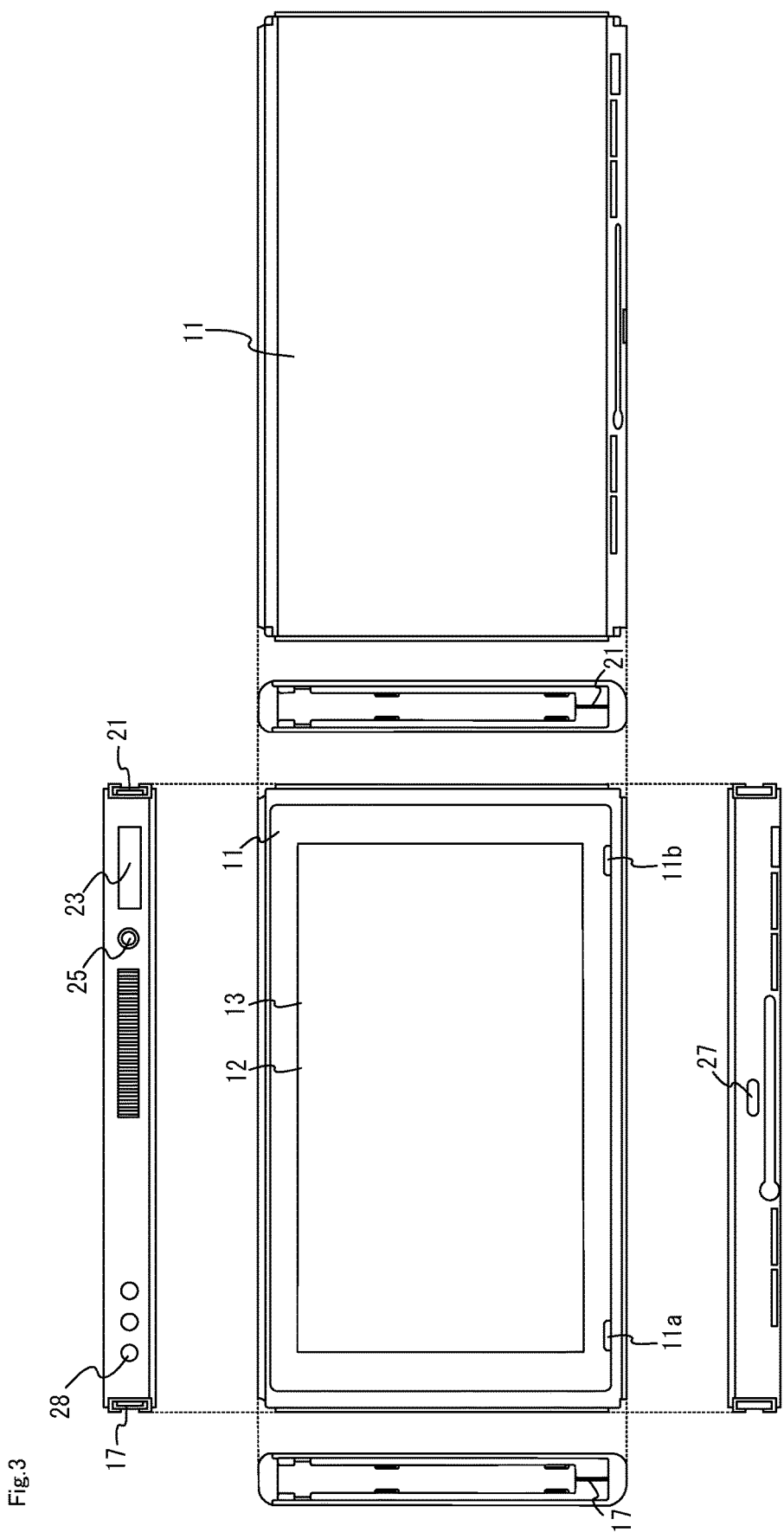
FIG. 3 is a six-sided view showing an example of a non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
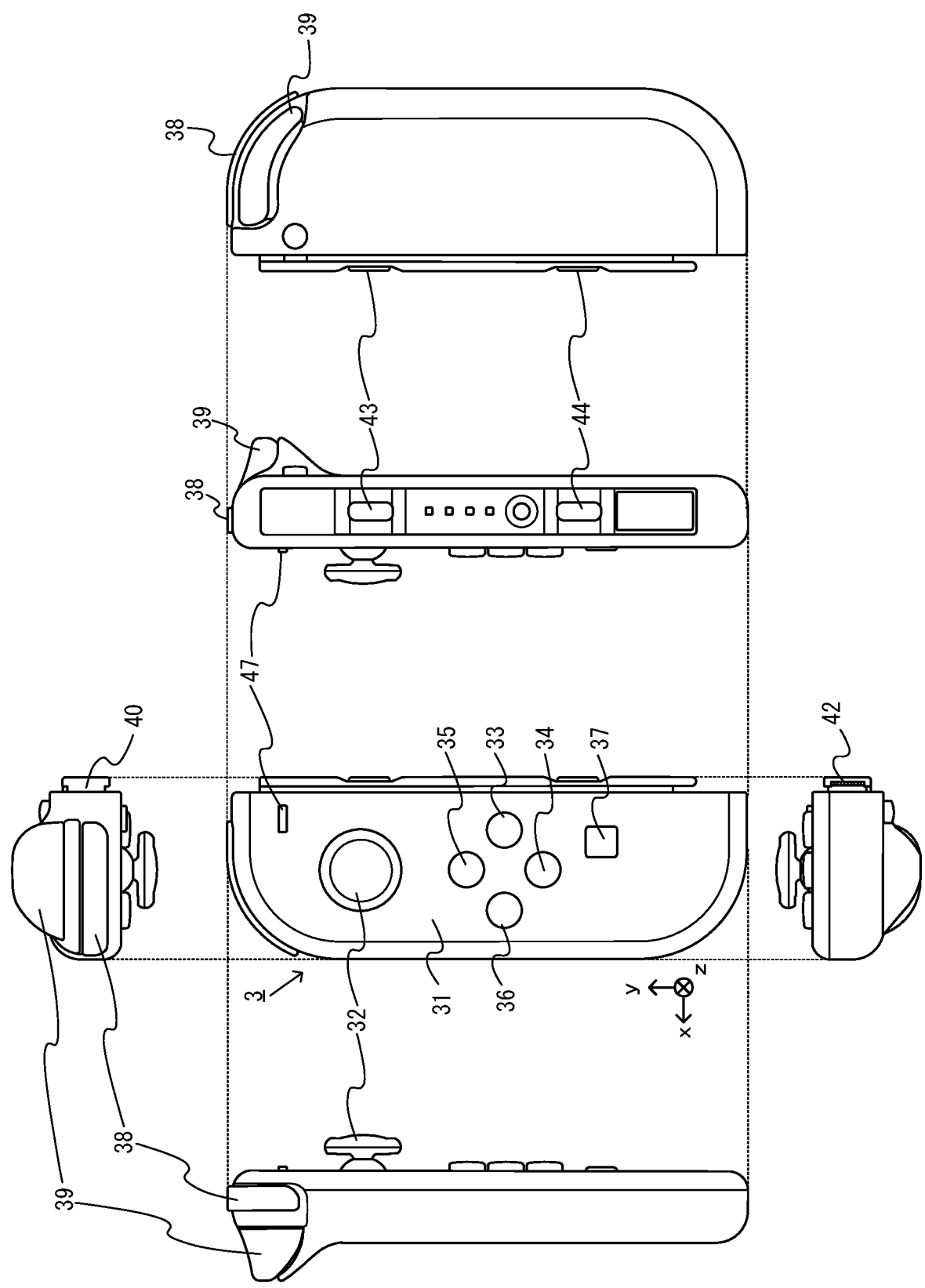
FIG. 4 is a six-sided view showing an example of a non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
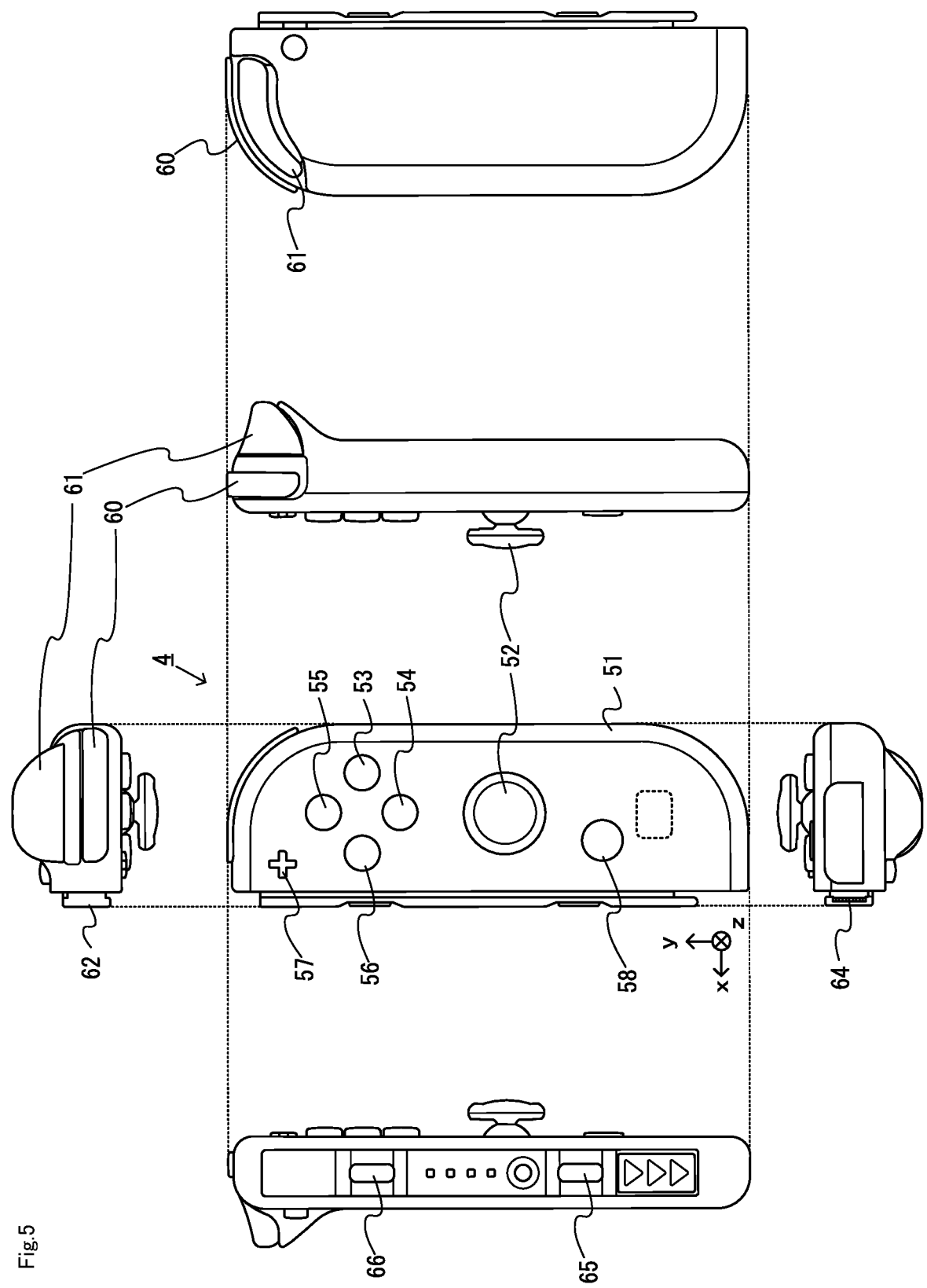
FIG. 5 is a six-sided view showing an example of a non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
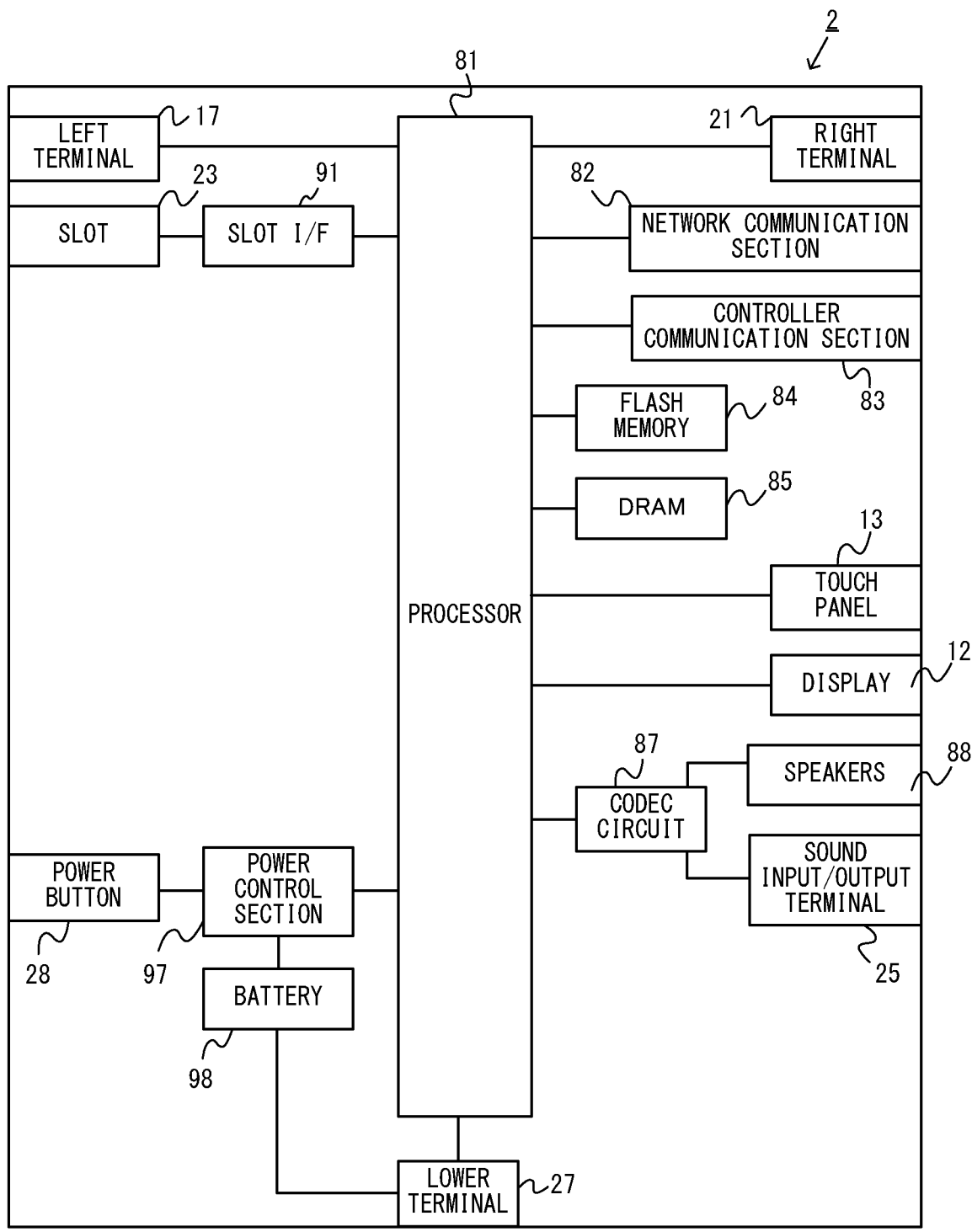
FIG. 6 is a block diagram showing an example of an internal configuration of a non-limiting main body apparatus.

FIG. 6 is a block diagram showing an example of the internal configuration of the main body apparatus 2. The main body apparatus 2 includes components 81 to 85, 87, 88, 91, 97, and 98 shown in FIG. 6 in addition to the components shown in FIG. 3. Some of the components 81 to 85, 87, 88, 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot OF 91 is connected to the processor 81. The slot OF 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
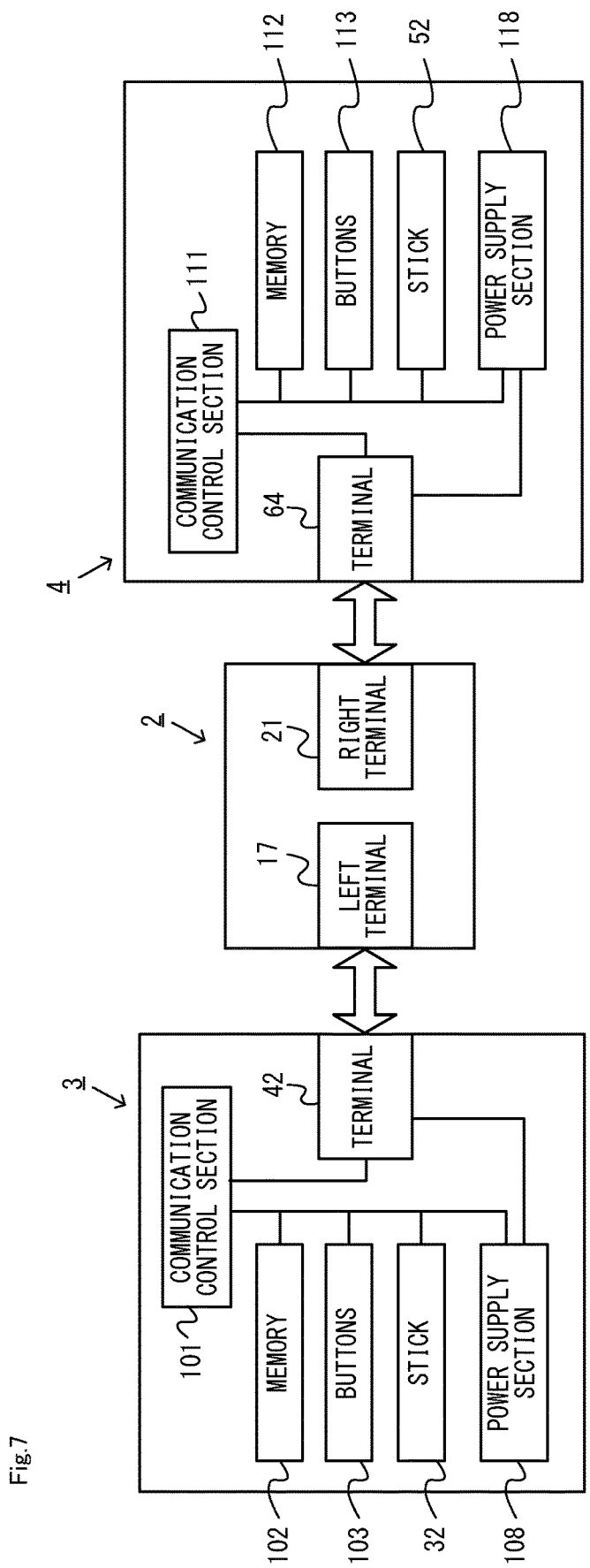
FIG. 7 is a block diagram showing an example of an internal configuration of a non-limiting main body apparatus, a non-limiting left controller and a non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103 and the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113 and the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

2. Outline of Processing in Game System

Next, an outline of processing executed in the game system 1 will be described with reference to FIG. 8 to FIG. 16. In the exemplary embodiment, the game system 1 executes a game in which a player character which can be operated by a player (i.e., the user of the game system 1) moves on a game field (hereinafter, simply referred to as "field") which is a three-dimensional virtual space and a sub character which is a fellow of the player character is caused to battle with an enemy character on the field.

In the exemplary embodiment, the above battle in the game is performed in two types of modes such as a command battle and an automatic battle. The command battle is a battle in a mode in which, by the player designating a command indicating an action (e.g., attack, capture, etc., described later) that can be performed by the sub character or the player character, the sub character or the player character is caused to perform the action corresponding to the designated command. In addition, the automatic battle is a battle in a mode in which a battle between the sub character and the enemy character is automatically performed. The above "automatically" means that after the start of a battle, the battle is progressed even if the player does not make any instruction related to the battle, and more specifically means that the battle is progressed without the player designating the above command. The command battle and the automatic battle will be described in detail below.

[2-1. Command Battle]

In the exemplary embodiment, the player character can possess a ball which is an item with which a sub character is associated, and the sub character associated with the ball possessed by the player character can be caused to perform a battle. In addition, by the player character throwing the ball on the field, the sub character associated with the ball can be caused to appear on the field. In the exemplary embodiment, the player character can use a predetermined number of (e.g., six) balls among possessed balls when moving on the field, and an order is set for the predetermined number of balls that can be used. In the case where a sub character appears on the field as a result of the player character throwing a ball on the field, the first sub character in the above order appears.

In the exemplary embodiment, the command battle is started when the player character throws a ball to an enemy character on the field. That is, when the player character throws a ball to an enemy character, a sub character appears from the ball, and the sub character that has appeared starts a battle with the enemy character.

Figure 8:
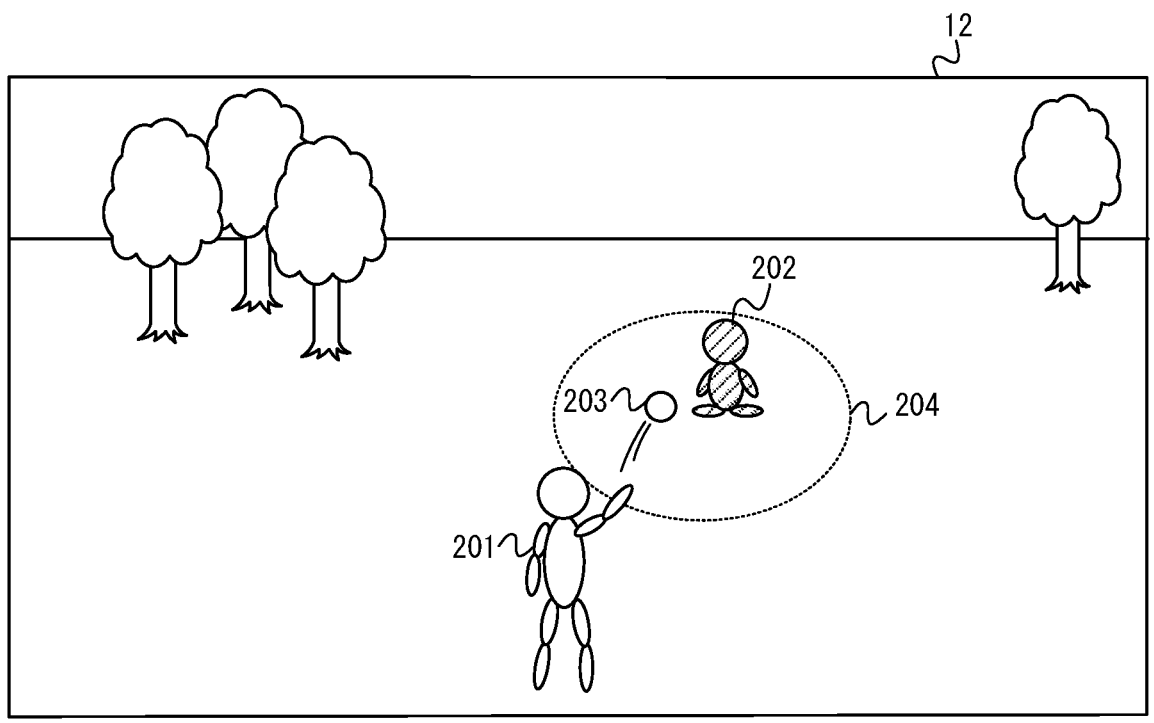
FIG. 8 is a diagram showing an example of a game image showing a state where a player character throws a ball to an enemy character.

FIG. 8 is a diagram showing an example of a game image showing a state where the player character throws a ball toward an enemy character. In the example shown in FIG. 8, a player character 201 and an enemy character 202 are placed on the field, and a game image showing a state where the player character 201 is throwing a ball 203 toward the enemy character 202 is displayed on the display 12. In the exemplary embodiment, the player can make an instruction (referred to as "throwing motion instruction") to cause the player character 201 to perform a motion of throwing a ball, by a predetermined operation input (e.g., an input by pressing the ZR-button 61 of the right controller 4).

When the throwing motion instruction is made, the game system 1 determines whether or not the enemy character 202 is present in a determination range 204 on the field. The determination range 204 is set based on the position and the direction of the player character 201. Specifically, the determination range 204 is a range having a predetermined size in front of the player character 201. The position, the size, and the shape of the determination range 204 may be discretionary. In addition, the determination range 204 may not necessarily be displayed, or may be displayed.

When the enemy character 202 is present in the determination range 204, the game system 1 causes the player character 201 to perform a motion of throwing the ball 203 toward the enemy character 202 (see FIG. 8). Then, when the ball 203 hits the enemy character 202, a sub character appears from the ball 203, and a battle between the sub character and the enemy character 202 is started. When a plurality of enemy characters are present in the determination range 204, the game system 1 selects one enemy character from among the plurality of enemy characters according to a predetermined criteria. The predetermined criteria is discretionary, and for example, the enemy character located closest to the player character 201 may be selected, or the enemy character located closest to the center of the determination range 204 may be selected. At this time, the game system 1 controls the motion of the player character 201 such that the player character 201 throws a ball toward the selected enemy character.

On the other hand, when the enemy character 202 is not present in the determination range 204, the game system 1 causes the player character 201 to perform a motion of throwing the ball 203 toward the front of the player character 201. In this case, although described in detail later, a sub character appears on the field and automatically moves on the sub character.

In the exemplary embodiment, in addition to hitting the enemy character with the ball 203, the command battle is also started by the player character 201 coming into contact with the enemy character. The player character 201 can move on the field in response to a direction input by the player (e.g., an input to the analog stick 32 of the left controller 3). Therefore, the player can start the command battle with the enemy character by making the throwing motion instruction in a state where the enemy character is located in front of the player character 201 or moving the player character 201 to come into contact with the enemy character.

Figure 9:
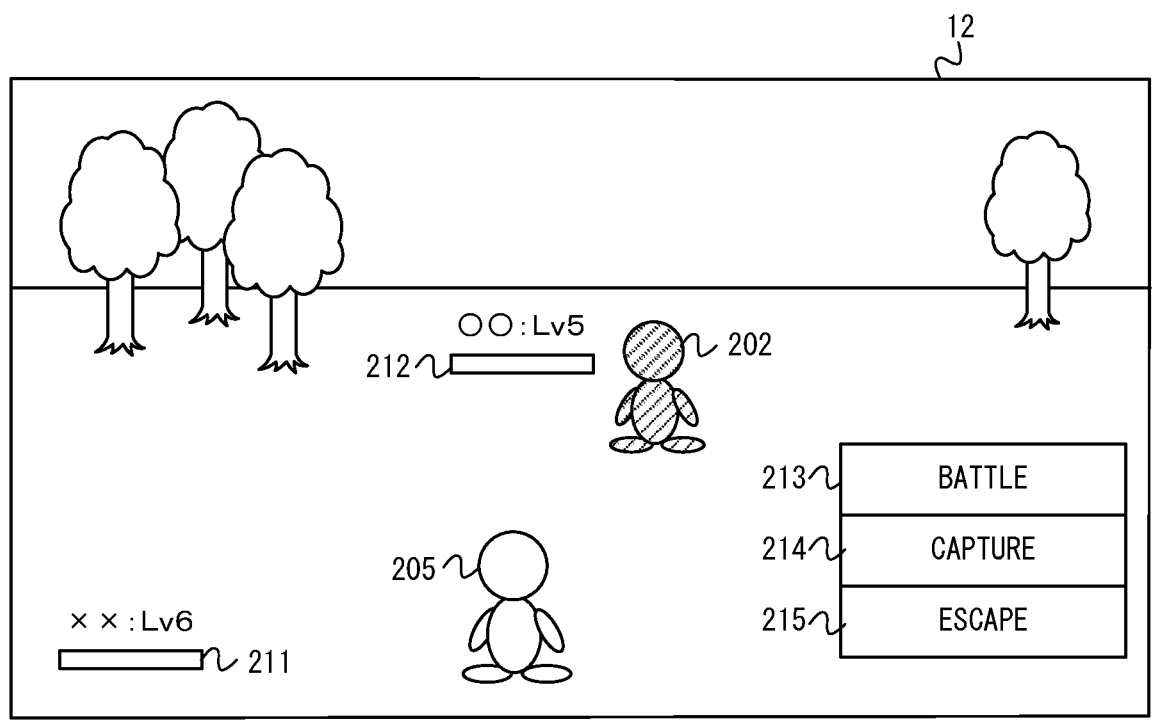
FIG. 9 is a diagram showing an example of a game image when a command battle is being performed.

FIG. 9 is a diagram showing an example of a game image when the command battle is being performed. As shown in FIG. 9, in the command battle, an image of a field including a sub character 205 and the enemy character 202 which perform the battle is displayed on the display 12. In addition, the game system 1 displays the name (shown as "xx" in the drawing) of the sub character 205, the level of the sub character 205, and a gauge image 211 showing the hit point of the sub character 205, and also displays the name (shown as "○○" in the drawing) of the enemy character 202, the level of the enemy character 202, and a gauge image 212 showing the hit point of the enemy character 202. Moreover, the game system 1 displays command images 213 to 215 showing commands that can be designated by the player.

As shown in FIG. 8 and FIG. 9, in the exemplary embodiment, the viewpoint of the game image (i.e., the position of a virtual camera which is set for generating a game image) changes before and after the start of the command battle. That is, in a field scene before the start of the command battle (i.e., a scene in which the player character moves on the field), the game system 1 sets the position and the direction of the virtual camera such that the player character 201 is included in the field-of-view range of the virtual camera (see FIG. 8). Meanwhile, in the command battle, the game system 1 sets the position and the direction of the virtual camera such that the sub character 205 and the enemy character 202 which perform the battle are included at least in the field-of-view range of the virtual camera (see FIG. 9). Moreover, the game system 1 may set the position and the direction of the virtual camera such that at least a part of the player character 201 is also included in the field-of-view range of the virtual camera. As described above, in the exemplary embodiment, when the command battle is started, the game scene is not switched (i.e., the field remains displayed), but the viewpoint of the game image changes.

As described above, in the exemplary embodiment, the command battle is stated after display control of moving the viewpoint such that the sub character and the enemy character which perform the battle are included at least in the field of view is performed, without switching the scene on the field. Accordingly, the player is allowed to easily recognize that the command battle has been started.

Moreover, in the exemplary embodiment, the movement of the player character is limited during the command battle. That is, the player character 201 does not move during the command battle. Or, the range where the player character 201 is movable is limited to a limited range at a location where the command battle is performed. On the other hand, in the automatic battle described later, the viewpoint is not moved as in the above, and the player character 201 can move on the field during the automatic battle.

In the exemplary embodiment, in the command battle, a so-called turn-based battle is performed. That is, in one turn, the player determines an action content of the sub character 205 by designating a command, an action content of the enemy character 202 is determined by the game system 1, and then the respective characters 202 and 205 perform the actions. Then, the versus game proceeds as the above turn is repeated until the battle ends. In other embodiments the game is not limited to the turn-based game as described above, and, in the command battle, a real-time game in which each character acts sequentially as time passes (the content of the action is determined by a command designated by the player) may be performed.

In the example shown in FIG. 9, the command image 213 shows a command for the sub character 205 to attack the enemy character 202. The command image 214 shows a command for the player character 201 to capture the enemy character 202. In the exemplary embodiment, whereas the sub character 205 attacks the enemy character, the player character 201 captures the enemy character, but the sub character 205 may capture the enemy character. That is, during the command battle, the player character may not necessarily perform a motion related to the battle. The command image 215 shows a command for the player character 201 and the sub character 205 to escape from the battle.

When the command image 213 is designated by the player, the game system 1 further displays a plurality of command images each showing a specific attack method, to allow the player to select the specific attack method. When the command image 214 is designated by the player, the game system 1 causes the player character 201 to perform a motion of capturing the enemy character 202. In the exemplary embodiment, whether or not the capture is successfully performed is determined by the game system 1, and when the capture is successfully performed, the player character 201 can use the captured enemy character as a sub character. In addition, when the command image 215 is designated by the player, the game system 1 determines whether or not the player character 201 can escape from the battle, and when it is determined that the player character 201 can escape, the game system 1 ends the command battle. On the other hand, when it is determined that the player character 201 cannot escape, the command battle is continued.

As described above, in the exemplary embodiment, in the command battle, any one of a plurality of commands including at least an attack by the sub character on the enemy character and capture of the enemy character is designated based on an operation input, and a motion, of the player character and/or the sub character, corresponding to the designated command is executed. Therefore, in the command battle, the player can capture the enemy character. Although described in detail later, the enemy character cannot be captured in the automatic battle.

When the sub character 205 defeats the enemy character 202 in the command battle (specifically, when the hit point of the enemy character 202 reaches 0), the player character 201 has won the battle. At this time, the player character 201 and/or the sub character 205 can acquire a victory reward (e.g., an experience value or an item). When the player character 201 has won the battle, for example, the game system 1 gives an experience value having a magnitude determined based on the enemy character 202, to the sub character 205, and gives an item of a type corresponding to the enemy character 202, to the player character 201.

In the above example, one sub character and one enemy character perform the command battle, but the numbers of sub characters and enemy characters that perform the command battle are discretionary. In other embodiments, a plurality of sub characters and enemy characters may participate in the command battle.

[2-2. Control of Sub Character on Field]

In the exemplary embodiment, the player character 201 can cause a sub character to appear on the field not only at the time of the command battle but also while player character 201 is moving on the field. Specifically, when the above throwing motion instruction is made, if no enemy character is present in the determination range, the player character 201 performs a motion of throwing the ball 203 in the own front direction, and then a sub character appears on the field. For example, at the time when the thrown ball 203 moves away from the player character 201 by a predetermined length (e.g., the time when the ball drops onto the field), the sub character appears from the ball 203.

Figure 10:
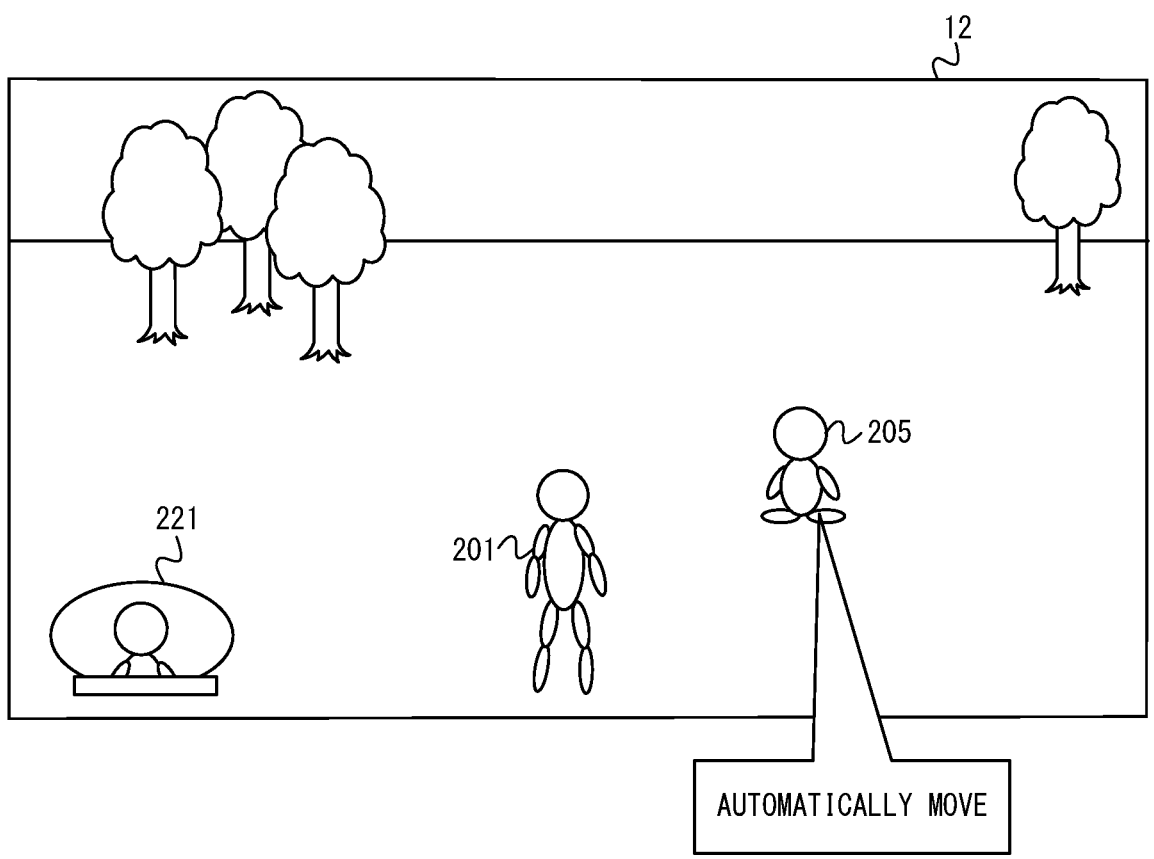
FIG. 10 is a diagram showing an example of a game image when a sub character appears on a field.

FIG. 10 is a diagram showing an example of a game image when the sub character appears on the field. In FIG. 10, the player character 201 is placed on the field, and the sub character 205 that has appeared from the ball thrown by the player character 201 is placed on the field. In the exemplary embodiment, a state where a sub character appears on the field, except during the command battle, is referred to as "appearance state".

When the sub character 205 is brought into an appearance state by the above throwing motion instruction, the sub character 205 automatically moves on the field. That is, in the above case, the sub character 205 is controlled by the game system 1 so as to automatically move. The "sub character automatically moves" means to include any movement mode in which the sub character moves even if an operation is not directly performed for the sub character by the player, and means that the sub character may move under the influence of an operation by the player. For example, the movement of the sub character 205 may be automatically controlled by the game system 1 such that the sub character 205 moves in response to the movement of the player character 201 which is operated by the player (e.g., follows the player character 201).

As described above, the automatic control for automatically moving the sub character may include movement control of causing the sub character to follow the player character. Accordingly, the sub character can be easily placed near the player character, so that the player can easily confirm the behavior of the sub character. In other embodiments, the movement control of the sub character may be performed by a discretionary method, and the sub character may be controlled so as to randomly move regardless of the movement of the player character.

Although described in detail later, in the exemplary embodiment, the sub character 205 that has appeared on the field performs the automatic battle with an enemy character or acquires an item in response to an instruction made by the player. However, in the exemplary embodiment, while the movement of the sub character 205 is being automatically controlled, the sub character 205 does not automatically (i.e., without an instruction from the player) start a battle with an enemy character or acquire an item. In other embodiments, the game system 1 may cause a sub character to automatically perform a battle with an enemy character or acquire an item.

In the exemplary embodiment, when the sub character 205 is brought into an appearance state, the game system 1 displays a state image 221 showing the state of the sub character 205 (see FIG. 10). In the example shown in FIG. 10, the state image 221 includes an image showing the sub character 205 and a gauge image showing the hit point of the sub character 205. Through the state image 221, the player can be notified that the sub character has appeared on the field and can be notified of the state of the sub character. The state image 221 may show discretionary information regarding the sub character, and may show, for example, information such as the name and the level of the sub character.

In the exemplary embodiment, when the sub character 205 is in an appearance state, the player can perform an exit instruction to cause the sub character 205 to exit the field. Specifically, in the above case, the game system 1 accepts the exit instruction, and causes the sub character 205 to exit the field in accordance with the exit instruction being made. The sub character that has exited the field is in a state where the sub character does not appear on the field, but is not deleted in the game and can be caused to appear on the field again by the above throwing motion instruction. In the embodiment in which the sub character appears from the ball 203, along with a representation in which the sub character becomes accommodated in the ball 203, a process of causing the sub character to exit may be performed in accordance with the exit instruction. In the exemplary embodiment, the exit instruction is made by the same operation input (i.e., an input by pressing the ZR-button 61) as that for the throwing motion instruction.

As described above, in the exemplary embodiment, when a predetermined operation input is performed in a state where a sub character has appeared, the game system 1 performs control of bringing the sub character into a state where the sub character does not appear on the field. Accordingly, the player can freely cause the sub character to appear on the field and exit the field. In the exemplary embodiment, the above predetermined operation input is an input to the same operation section (i.e., the ZR-button 61) as that for the operation input for causing the sub character to appear on the field. Accordingly, the player can cause the sub character to appear on the field and exit the field by using one operation section, so that the operation becomes easier. In other embodiments, the above predetermined operation input may be an operation input to an operation section different from that for the operation input for causing the sub character to appear on the field.

In the exemplary embodiment, while the sub character 205 is in an appearance state, the player character 201 can move on the field in response to a direction input by the player. While the sub character 205 is in the appearance state, the command battle is started when the player character 201 comes into contact with an enemy character. At this time, the command battle is performed between the enemy character and the sub character that has appeared on the field.

As described above, in the exemplary embodiment, when the player character comes into an enemy character, the game system 1 controls a battle between a sub character and the enemy character by the command battle regardless of whether or not the sub character has appeared on the field. Accordingly, even when the sub character has appeared on the field or even when the sub character has not appeared on the field, the player can easily start the command battle. In other embodiments, the game system 1 may not necessarily perform the command battle while a sub character is appearing on the field.

In the exemplary embodiment, when the sub character that has appeared in the above-described command battle wins the command battle, after the command battle, the sub character is brought into an appearance state where the sub character is placed on the field, and the movement of the sub character is automatically controlled. On the other hand, when the sub character loses in the command battle, after the command battle, the sub character is brought into a state where the sub character does not appear on the field. However, in other embodiments, the sub character that has appeared in the command battle may be brought into a state where the sub character exits the field, after the command battle, regardless of a win or a loss in the command battle. In addition, in other embodiments, when the sub character performs the command battle from a state where the sub character has exited the field (i.e., the command battle is started by the throwing motion instruction), the sub character may be brought into a state where the sub character has exited the field, after the command battle, and when the sub character performs the command battle from an appearance state, the sub character may be brought into an appearance state after the command battle.

In the exemplary embodiment, when the sub character is in an appearance state, the player can move the sub character toward a predetermined position on the field by a target movement instruction. The target movement instruction can be made, for example, by an input to the first R-button 60 of the right controller 4. When the target movement instruction is made, the sub character ends the automatically controlled movement that has been made so far, and moves toward a target position (see FIG. 11 described below) designated by the target movement instruction.

Figure 11:
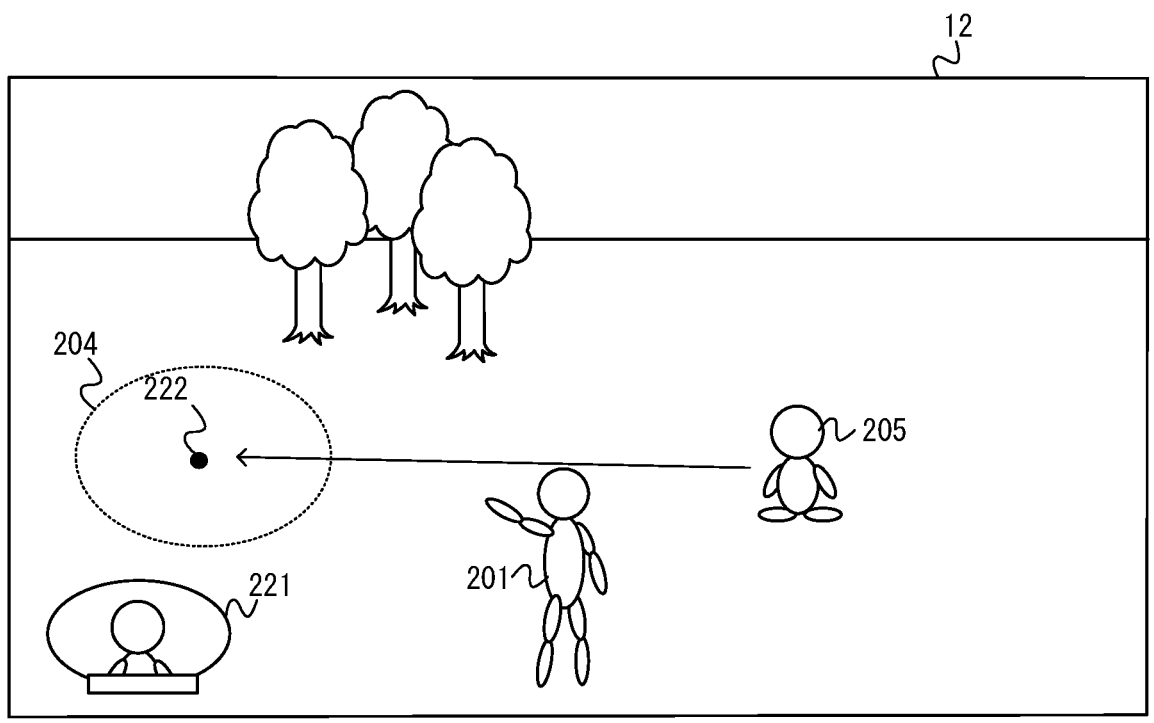
FIG. 11 is a diagram showing an example of a game image when the sub character moves on the field in response to a target movement instruction.

FIG. 11 is a diagram showing an example of a game image when the sub character moves on the field in response to the target movement instruction. The game image shown in FIG. 11 shows a state where the sub character 205 moves to a target position 222 in response to the target movement instruction.

When the target movement instruction is made, the game system 1 sets the target position 222 in the above determination range 204 which is set based on the position and the direction of the player character 201, and moves the sub character 205 toward the target position 222 (see an arrow shown in FIG. 11). The target position 222 is, for example, the position of the center of the determination range 204. In the exemplary embodiment, the determination range 204 and the target position 222 are not displayed, but in other embodiments, an image showing the determination range 204 and the target position 222 may be displayed. In addition, in the exemplary embodiment, when the target movement instruction is made, the game system 1 causes the player character 201 to perform a motion of pointing forward (i.e., toward the target position 222). Accordingly, the player can be notified that the target movement instruction has been made and can be notified of an approximate position of the target position 222.

In the exemplary embodiment, the determination range used when the above-described throwing motion instruction is made and the determination range used when the target movement instruction is made are the same in position, size, and shape. Accordingly, it is easier for the player to make the throwing motion instruction and the target movement instruction. In other embodiments, these determination ranges may have different positions, sizes, and/or shapes.

As described above, in the exemplary embodiment, when the operation input for the target movement instruction is made, the game system 1 performs control of moving the sub character 205 toward a predetermined position (in the example shown in FIG. 11, the target position 222) set in front of the player character 201. Accordingly, the sub character 205 in the appearance state can be caused to move to the position designated by the player. The predetermined position is the target position 222 in the example shown in FIG. 11, but may be set to the position of an enemy character or an item in the determination range as shown in an example described later.

A specific movement mode in the case where the sub character 205 moves to the target position 222 is discretionary. As an example, in the exemplary embodiment, when the position of the sub character 205 at the time when the target movement instruction is made is far from the position of the player character 201 (specifically, the position of the sub character 205 and the position of the player character 201 are away from each other by a predetermined distance or longer), the game system 1 warps the sub character 205 to a position near the player character 201, and then moves the sub character 205 from this position to the target position 222. In addition, even when the position of the sub character 205 at the time when the target movement instruction is made is not far from the position of the player character 201, if the player character 201 is located closer to the target position 222 than the sub character 205 is, the game system 1 warps the sub character 205 to a position near the player character 201, and then move the sub character 205 from this position to the target position 222. On the other hand, when the position of the sub character 205 at the time when the target movement instruction is made is not far from the position of the player character 201 and the sub character 205 is located closer to the target position 222 than the player character 201 is, the game system 1 moves the sub character 205 from the current position to the target position 222. According to the above, the time required for the sub character 205 to move to the target position 222 can be shortened.

When the target position is a position to which the sub character 205 cannot move from the current position, the game system 1 may not necessarily move the sub character 205 to the target position. This case is, for example, a case where there is a step between the current position of the sub character 205 and the target position and the sub character 205 cannot move over the step, or a case where the target position is on water or in the air and the sub character 205 cannot move on water or in the air.

If an enemy character is included in the above determination range when the target movement instruction is made, the game system 1 sets the position of the enemy character as the target position and moves the sub character toward the enemy character. In this case, the automatic battle is performed between the sub character and the enemy character.

Figure 12:
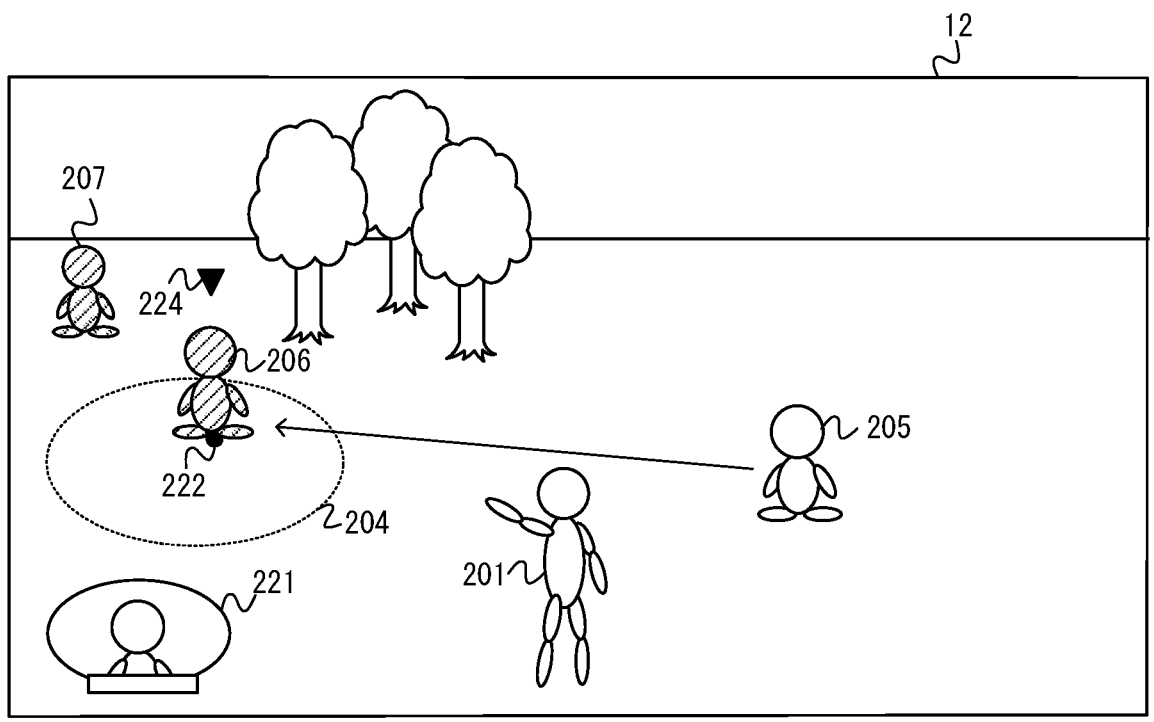
FIG. 12 is a diagram showing an example of a game image when the sub character moves toward an enemy character in response to a target movement instruction.

FIG. 12 is a diagram showing an example of a game image when the sub character moves toward the enemy character in response to the target movement instruction. In the example shown in FIG. 12, an enemy character 206 is placed in the determination range 204 which is based on the position and the direction of the player character 201 at the time when the target movement instruction is made. In addition, an enemy character 207 is placed outside the determination range 204.

As shown in FIG. 12, when the enemy character 206 is located in the determination range 204 at the time when the target movement instruction is made, the game system 1 sets the target position 222 for the sub character 205 to the position of the enemy character 206. Accordingly, the sub character 205 moves toward the enemy character 206 (see an arrow shown in FIG. 12). When a plurality of enemy characters are present in the determination range 204, the game system 1 selects one enemy character from among the plurality of enemy characters according to a predetermined criteria. The predetermined criteria is discretionary. For example, the enemy character located closest to the player character 201 or the sub character 205 may be selected, or the enemy character located closest to the center of the determination range 204 may be selected.

In the example shown in FIG. 12, when the sub character 205 moves to the vicinity of the enemy character 206 (i.e., the enemy character 206 is located in a predetermined action range which is based on the sub character 205), the automatic battle between the sub character 205 and the enemy character 206 is started. When the target position 222 is set to the position of the enemy character 206, the game system 1 displays a marker image 224 showing the enemy character 206 (see FIG. 12). Accordingly, the player can be notified of the enemy character that is to be an opponent in the automatic battle. Such a marker image may be displayed before the target movement instruction is made. That is, in a state where the target movement instruction can be made, the game system 1 may display a marker image for an enemy character that is set as an opponent in the automatic battle if the target movement instruction is made at that time.

In the exemplary embodiment, when the target position is set to the position of an enemy character, even if the sub character passes through the vicinity of another enemy character different from that enemy character while moving to the target position, the game system 1 does not cause the sub character and the other enemy character to perform a battle therebetween. Accordingly, the sub character can be prevented from performing a battle with the other enemy character before a battle with the enemy character that is an opponent designated by the player through the target movement instruction. In other embodiments, if the sub character passes through the vicinity of the other enemy character while moving to the target position, the game system 1 may cause the sub character and the other enemy character to perform the automatic battle therebetween.

In the exemplary embodiment, an item that can be acquired by the player character 201 may be placed on the field. When the item is located in the determination range 204 at the time when the target movement instruction is made, the game system 1 sets the target position 222 for the sub character 205 to the position of the item. Accordingly, the sub character 205 moves toward the item. Then, when the sub character 205 moves to the vicinity of the item (i.e., the item is located in the above action range which is based on the sub character 205), the sub character 205 acquires the item. Accordingly, the player character 201 can acquire the item. That is, the player can acquire the item on the field by using the sub character. When both an enemy character and an item are present in the determination range 204, the game system 1 may select one of the plurality of targets (i.e., the enemy character and the item) according to a predetermined criteria. For example, the game system 1 may select the enemy character in preference to the item.

In the exemplary embodiment, even in a state where a sub character has not appeared on the field, the player can make the target movement instruction, and the sub character can be caused to move to the target position designated by the target movement instruction. That is, even in a state where a sub character has not appeared on the field, the game system 1 accepts the operation input for the target movement instruction. Then, when the target movement instruction is made in the above state, the game system 1 causes the player character 201 to perform a motion of throwing a ball to cause the sub character to appear on the field, and further moves the sub character that has appeared, to the target position which is set in accordance with the above target movement instruction.

As described above, in the exemplary embodiment, when a predetermined operation input (i.e., the operation input for the target movement instruction) is performed in a state where a sub character has not appeared on the field, the game system 1 causes the sub character to appear on the field and also performs control of moving the sub character toward a predetermined position (i.e., the target position). Accordingly, the player can cause the sub character to both appear and move to the predetermined position by the above predetermined operation input, so that the operation for the sub character can be simplified and the operability of this operation can be improved. In other embodiments, in a state where a sub character has not appeared on the field, the game system 1 may not necessarily accept the target movement instruction.

In the exemplary embodiment, even when the target movement instruction is made in a state where a sub character has not appeared on the field, the target position is set in accordance with the target movement instruction in the same manner as when the target movement instruction is made in a state where the sub character has appeared. That is, if no target object (i.e., enemy character or item) is present in the determination range, the target position is set to the center position of the determination range, and if a target object is present in the determination range, the position of the object is set as the target position.

[2-3. Automatic Battle]

Figure 13:
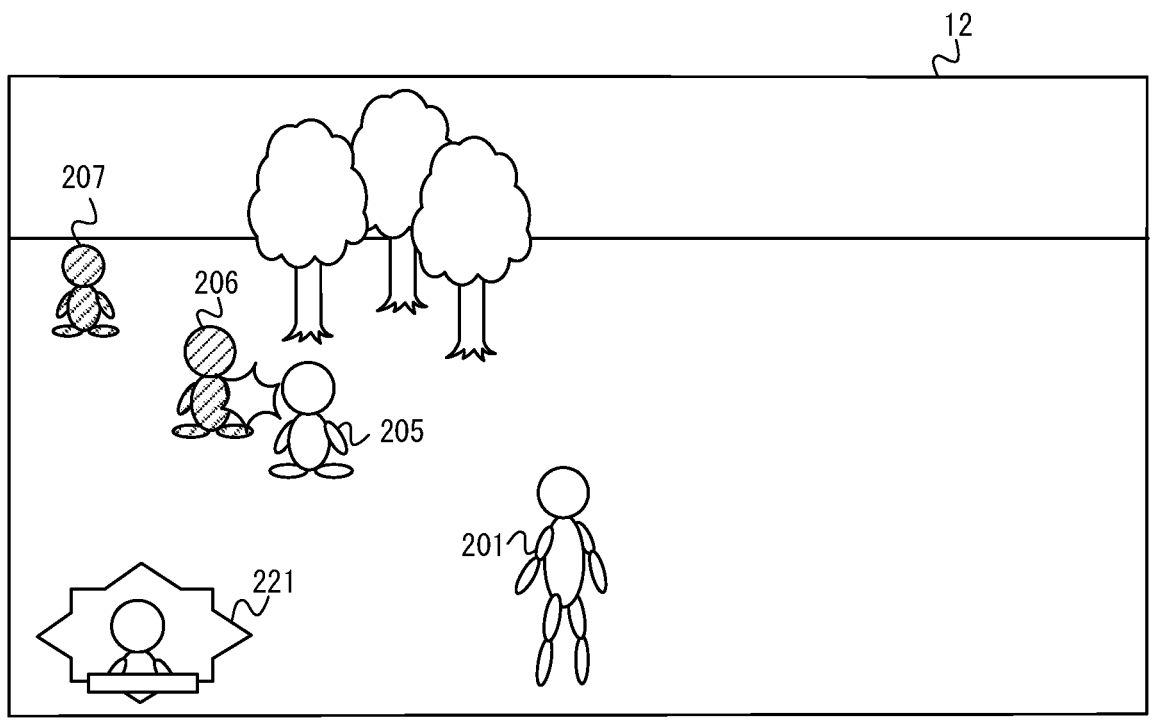
FIG. 13 is a diagram showing an example of a game image when the sub character and the enemy character perform an automatic battle.

FIG. 13 is a diagram showing an example of a game image when the sub character and the enemy character are performing the automatic battle. In the example shown in FIG. 13, as a result of the sub character 205 moving toward the enemy character 206 from the situation shown in FIG. 12, the automatic battle is being performed between the sub character 205 and the enemy character 206.

In the exemplary embodiment, the automatic battle proceeds even if the player does not perform an input related to the battle. That is, the game system 1 causes the battle to automatically proceed without accepting any command related to the automatic battle. Specifically, in the exemplary embodiment, the game system 1 determines a win and a loss in the automatic battle, based on ability parameters (e.g., maximum hit point, attack power, defense power, quickness, etc.) of the sub character 205 and the enemy character 206 which battle with each other. In addition, the game system 1 calculates damage received by the sub character 205 in the automatic battle, and calculates the hit point value of the sub character 205 after the battle. When the automatic battle is started, the game system 1 may cause the sub character 205 and the enemy character 206 to perform attack motions, respectively. These attack motions may be motions having predetermined contents, or the motions performed may be unrelated to the win and the loss in the battle.

As described above, in the automatic battle, a battle is performed in a simplified manner as compared to the command battle, and the player can perform the battle without taking time and effort for an operation. In the exemplary embodiment, the player causes a sub character to perform the command battle when the player desires to make an instruction (i.e., command) related to a battle, and can cause the sub character to perform the automatic battle when the player desires to perform a battle in a simplified manner without making any instruction. In the exemplary embodiment, since a battle can be performed by the two types of methods such as the command battle and the automatic battle, the player can select a battle method, for example, according to their preferences or the game situation.

As shown in FIG. 13, in the exemplary embodiment, even when the automatic battle is started, unlike when the command battle is started, the viewpoint of the game image (i.e., the position of the virtual camera) does not change. That is, during the automatic battle, the game system 1 controls the position and the direction of the virtual camera such that the player character 201 is included in the field-of-view range of the virtual camera (see FIG. 13). In the exemplary embodiment, during the automatic battle, as in while the automatic battle is not being performed, the game system 1 changes the position and the direction of the viewpoint in accordance with a viewpoint operation input (e.g., a direction input to the analog stick 52 of the right controller 4) by the player. That is, the player can change the viewpoint of the game image during the automatic battle as in while the automatic battle is not being performed.

Moreover, during the automatic battle, unlike during the command battle, the player character 201 can move on the field. That is, even during the automatic battle, the game system 1 accepts a direction input for moving the player character 201. As described above, during the automatic battle, as in the case where the player character 201 is moving on the field in a normal scene other than during a battle, the player can move the player character 201 or change the viewpoint of the game image.

As described above, in the exemplary embodiment, the automatic battle is started without switching the scene on the field, and movement control of the player character 201 based on a movement operation input is executed during the automatic battle. That is, the player can cause a sub character to perform the automatic battle even while moving the player character 201 on the field. Accordingly, for example, while moving the player character 201 to a destination on the field, the player can cause the sub character to perform the automatic battle without interrupting the movement of the player character 201. Therefore, for the player who desires to quickly arrive at the destination but also desires to cause the sub character to perform a battle, it is convenient to cause the sub character to perform the automatic battle. In other embodiments, even during the automatic battle, as in during the command battle, the movement of the player character 201 may be limited, or the viewpoint of the game image may be changed (e.g., may be changed such that the sub character is displayed at the center of the screen) at the start of the battle.

Moreover, in the exemplary embodiment, while the automatic battle is being performed, the shape of the state image 221 regarding the sub character 205 is changed so as to show that the automatic battle is being performed (see FIG. 13). In the examples shown in FIG. 12 and FIG. 13, the shape of the state image 221 is elliptical while the automatic battle is not being performed, and is polygonal while the automatic battle is being performed. Accordingly, the player can be notified that the automatic battle is being performed. For example, there may be cases where the sub character 205 is not included in the field-of-view range of the game image during the automatic battle, and even in such as case, the player can know whether or not the sub character 205 is performing the automatic battle, through the state image 221.

Figure 14:
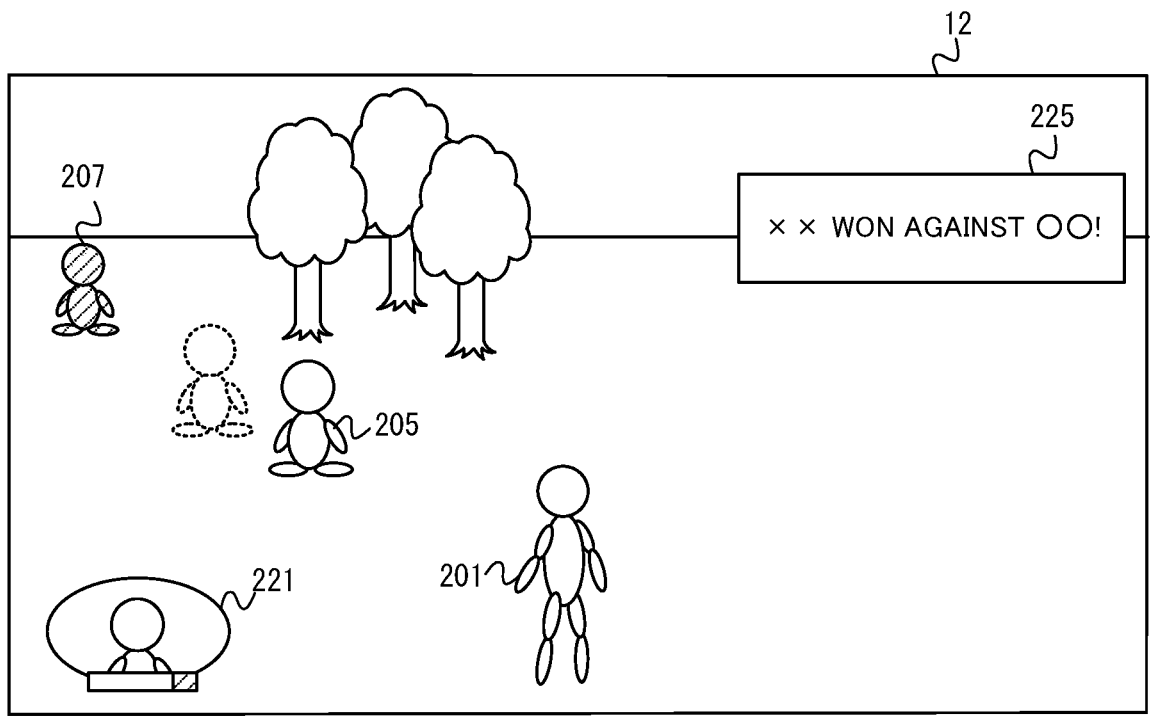
FIG. 14 is a diagram showing an example of a game image when the sub character wins the automatic battle.

FIG. 14 is a diagram showing an example of a game image when the sub character wins the automatic battle. The example shown in FIG. 14 shows a situation in which the sub character 205 has won against the enemy character 206 from the situation shown in FIG. 13. At this time, the enemy character 206 which has lost disappears from the field (in FIG. 14, the disappearance of the enemy character 206 is indicated by a dotted line). In addition, the game system 1 displays a notification image 225 notifying that the sub character 205 has won.

In the exemplary embodiment, in the automatic battle, as in the command battle, when the sub character 205 wins the battle, a victory reward is given. Specifically, when the player character 201 wins the battle, the game system 1 gives an experience value having a magnitude determined based on the enemy character 206, to the sub character 205, and also gives an item of a type corresponding to the enemy character 206, to the player character 201.

In the exemplary embodiment, the victory reward to be given in the automatic battle is set so as to be less than the victory reward to be given when wining against the same enemy character in the command battle. For example, when a sub character wins against a certain enemy character in the automatic battle, an experience value lower than an experience value to be given when wining against the enemy character in the command battle (e.g., ⅓ of the experience value) is given to the sub character. Accordingly, it is easier to acquire more victory rewards in the command battle than in the automatic battle, so that motivation to perform the command battle can be given to the player, and the possibility that the player performs only the automatic battle in which the operation is simple can be reduced. The "victory reward to be given in the automatic battle is set so as to be less than the victory reward to be given in the command battle" means to include both a method in which the reward to be given in a single battle is less and a method in which the total of rewards to be given in a plurality of battles is less. For example, in other embodiments, in the case where an item corresponding to an enemy character that is defeated in a battle is given based on a probability, when wining the automatic battle, the game system 1 may make the total number of items given through a plurality of automatic battles to be less than the total number of items given in a plurality of command battles, by giving an item with a lower probability than when wining the command battle.

In the exemplary embodiment, if another enemy character is placed around the sub character 205 (in the example shown in FIG. 14, the enemy character 207 is located in the above action range which is based on the sub character 205) at the time when the sub character 205 wins the automatic battle with the enemy character 206, the sub character 205 continues the automatic battle. That is, in the above case, the sub character 205 moves to the vicinity of the enemy character 207 and then starts the automatic battle with the enemy character 207. When the sub character 205 wins the automatic battle with the second or later enemy character, as in the case of wining the automatic battle with the first enemy character, if another enemy character is placed around the sub character 205, the sub character 205 continues the automatic battle.

As described above, in the exemplary embodiment, when the automatic battle between a sub character and an enemy character ends, if another enemy character is placed in a predetermined range including the position of the sub character (i.e., the above action range), the game system 1 starts the automatic battle between the sub character and the other enemy character. Accordingly, when the sub character is caused to perform the automatic battle with a plurality of enemy characters placed at close distances, the player does not have to repeatedly make the target movement instruction, so that the operability of the operation for the sub character can be improved. In other embodiments, in the above case, the game system 1 may not necessarily cause the sub character to newly start the automatic battle with the other enemy character.

On the other hand, if any other enemy character is not placed around the sub character 205 (in the example shown in FIG. 14, the enemy character 207 is not located in the above action range which is based on the sub character 205) at the time when the sub character 205 wins the automatic battle with the enemy character 206, the sub character 205 ends the automatic battle. In this case, the sub character 205 is controlled by the game system 1 so as to automatically move.

As described above, in the exemplary embodiment, when the automatic battle ends, the game system 1 starts automatic control of automatically moving the sub character. Accordingly, the sub character performs motions even if the player does not make any instructions after the automatic battle ends, so that the player can omit the time and effort for an operation. The above "when the automatic battle ends" means to indicate the case where, when the automatic battle is continuously performed with a plurality of enemy characters as a result of another enemy character being placed around the sub character at the time of end of the automatic battle with a certain enemy character, the automatic battle with the plurality of enemy characters ends. In other embodiments, the method for controlling the sub character when the automatic battle ends is discretionary, and when the automatic battle ends, the sub character may stop its motion until a certain instruction is made by the player.

Figure 15:
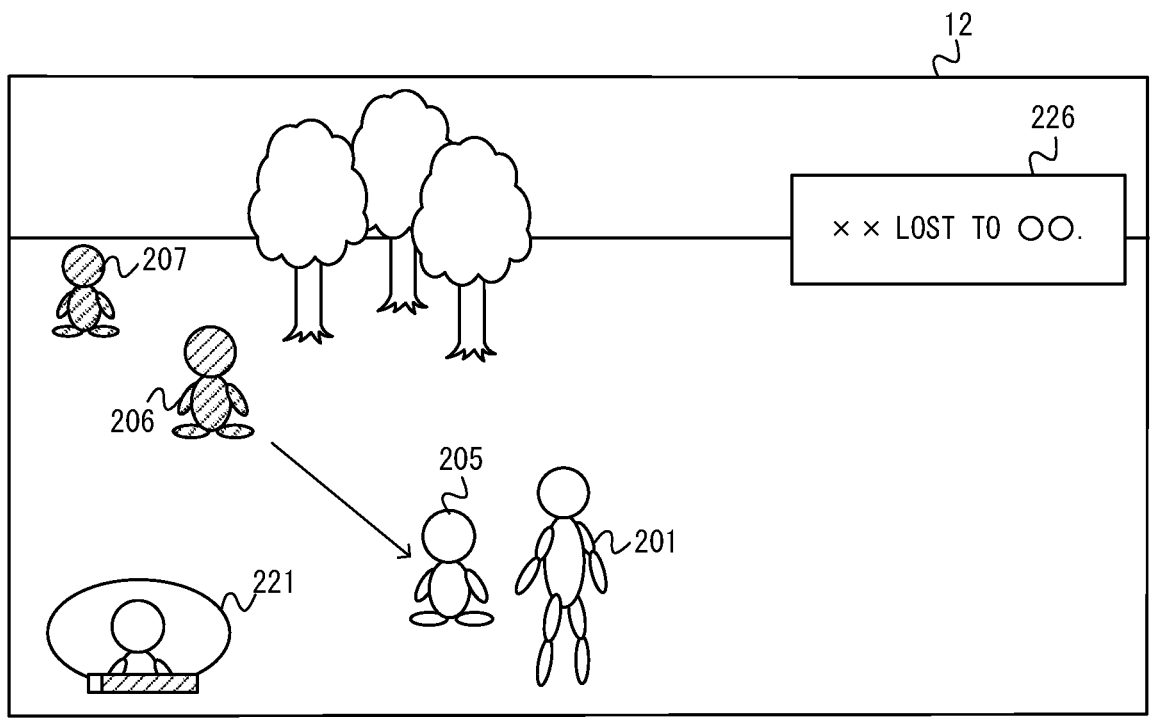
FIG. 15 is a diagram showing an example of a game image when the sub character loses in the automatic battle.

FIG. 15 is a diagram showing an example of a game image when the sub character loses in the automatic battle. The example shown in FIG. 15 shows a situation in which the sub character 205 has lost to the enemy character 206 from the situation shown in FIG. 13. At this time, the sub character 205 which has lost moves so as to come back to the player character 201 (see an arrow shown in FIG. 15). In addition, the game system 1 displays a notification image 226 notifying that the sub character 205 has lost.

In the above-described command battle, the sub character 205 loses in the battle when the hit point of the sub character 205 reaches 0. In other words, the hit point of the sub character 205 reaches 0 when the sub character 205 loses in the battle. When the hit point of the sub character 205 reaches 0, the sub character 205 cannot appear on the field and cannot perform a battle. On the other hand, in the automatic battle, even if the sub character 205 loses in the battle, the hit point of the sub character 205 does not reach 0 but is set to a predetermined value (in the exemplary embodiment, 1) less than the upper limit of the hit point. Therefore, the automatic battle can be said to be less risky than the command battle, and the player can lightheartedly cause the sub character 205 to perform the automatic battle. In other embodiments, when the sub character 205 loses in the automatic battle, as in the case of the command battle, the hit point of the sub character 205 may be set to 0.

Even when the target movement instruction is made, if a predetermined limitation condition is satisfied, the game system 1 may not necessarily move the sub character 205 to the target position. For example, the limitation condition is that the hit point of the sub character is equal to or lower than a predetermined value (e.g., 20). This is to prevent the automatic battle from being performed in a state where the possibility of a loss is high (i.e., a state where the hit point value is low). In addition to the above, the game system 1 may set, as the limitation condition, a condition that a specific enemy character is placed in the determination range which is based on the target movement instruction. The above specific enemy character is, for example, a rare enemy character that rarely appears on the field. Here, in the exemplary embodiment, in the automatic battle, the player cannot make an instruction through a command and cannot acquire an enemy character. Therefore, in order to prevent the player from missing the opportunity to capture the above rare enemy character due to defeat of the rare enemy character by the sub character 205 in the automatic battle, the automatic battle is not performed with the above specific character.

The specific content of the above limitation condition is discretionary, and a condition other than the above may be used. For example, when an upper limit level for sub characters at which the player character 201 can make instructions is set in accordance with the progress of a story of the game, even when the target movement instruction is made, a sub character whose level is equal to or higher than the upper limit level may not necessarily be caused to move to the target position.

[2-4. Selection Instruction]

In the exemplary embodiment, in a state where an operation of moving the player character 201 on the field can be performed, the player can perform an operation input for a selection instruction. The selection instruction is an instruction to set one enemy character placed on the game field, as a selection target. That is, when the selection instruction is made, the game system 1 sets the enemy character as the selection target. In the exemplary embodiment, the use of the selection instruction allows the above-described throwing motion instruction for performing the command battle or the above-described target movement instruction for performing the automatic battle to be easily made. Hereinafter, the selection instruction will be described in detail.

In the exemplary embodiment, the selection instruction is made by a predetermined operation input to the controller (e.g., an input by pressing the ZL button 39 of the left controller 3). In the exemplary embodiment, the game system 1 determines that the selection instruction is being made, while the predetermined operation input is being performed (i.e., while the ZL button 39 is being pressed), and determines that the selection instruction is not being performed, in accordance with the operation input being no longer performed (i.e., the ZL button 39 being no longer pressed). The specific input method for the selection instruction is discretionary. For example, in other embodiments, the game system 1 may determine that the selection instruction has been started, in accordance with a predetermined operation input being performed, and may determine that the selection instruction has been cancelled, in accordance with the operation input being performed again.

Figure 16:
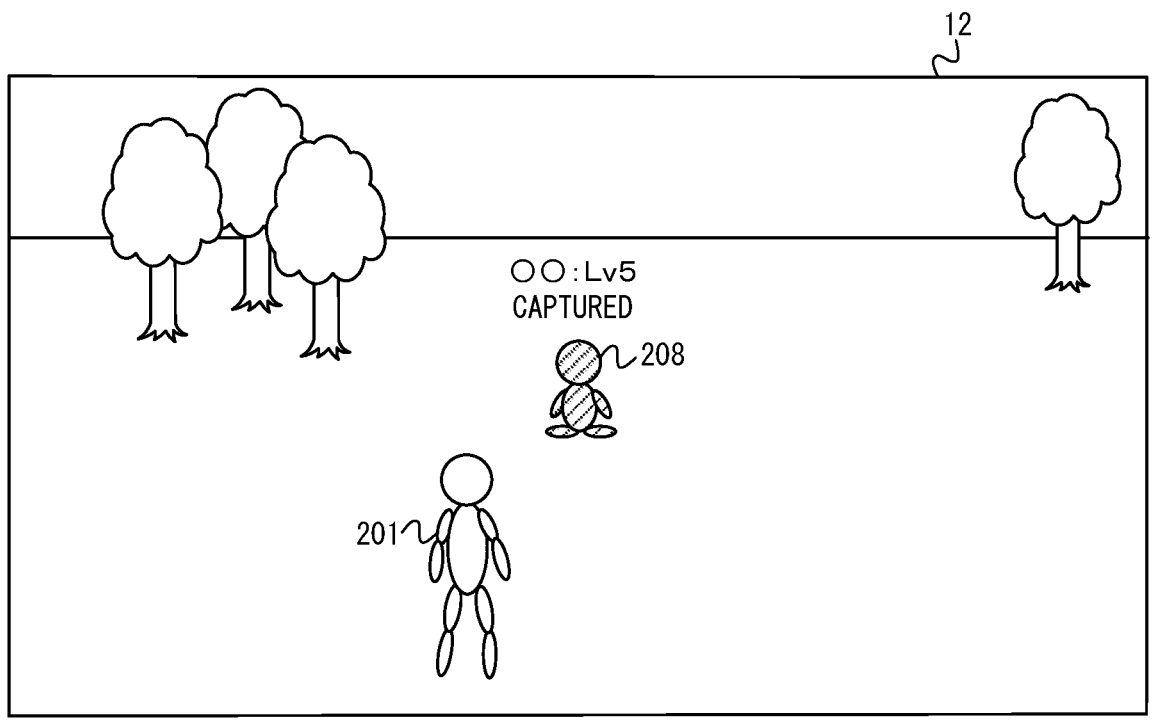
FIG. 16 is a diagram showing an example of a game image when a selection instruction is being made.

FIG. 16 is a diagram showing an example of a game image when the selection instruction is being made. In the exemplary embodiment, when the selection instruction is being made, the game system 1 controls the position and the direction of the virtual camera such that an enemy character 208 which is a selection target is displayed at a predetermined position around the center of the screen as shown in FIG. 16. That is, the game system 1 controls the virtual camera such that the gaze point of the virtual camera is aligned with the enemy character 208 which is a selection target. At the time when the selection instruction is started, the game system 1 sets, for example, an enemy character placed closest to the above predetermined position, as the selection target. If the enemy character 208 moves while the selection instruction is being made, the game system 1 changes the position and/or the direction of the virtual camera such that the enemy character 208 is displayed at the above predetermined position.

While the selection instruction is being made, the game system 1 displays information about the enemy character 208 which is a selection target. In the exemplary embodiment, as shown in FIG. 16, the name (shown as "∘∘" in FIG. 16) of the enemy character 208 which is a selection target, the level of the enemy character 208, and information indicative of having been captured or not, are displayed. The above information is displayed, for example, near the enemy character 208. The information indicative of having been captured or not is information indicating whether or not an enemy character of the same type as the enemy character which is a selection target has been captured. In addition, the content of the displayed information is discretionary, and in other embodiments, for example, the hit point, the attribute, etc., of the enemy character which is a selection target may be displayed in addition to (or instead of) the above information.

In the exemplary embodiment, even while the selection instruction is being made, the player can make the above-described throwing motion instruction. Here, when the throwing motion instruction is made in a state where the selection instruction is being made, the game system 1 controls the player character 201 such that the player character 201 throws a ball toward an enemy character that is a selection target. That is, in the above case, the command battle between a sub character and the enemy character that is a selection target is started.

Moreover, in the exemplary embodiment, even when the sub character is in an appearance state, the player can make the selection instruction. Furthermore, even while the selection instruction is being made, the player can make the target movement instruction. When the target movement instruction is made in a state where the selection instruction is being made, the game system 1 sets the position of the enemy character that is a selection target, as the target position, and moves the sub character toward the enemy character that is a selection target. That is, in the above case, the automatic battle between the sub character and the enemy character that is a selection target is started.

As described above, in the exemplary embodiment, the game system 1 selects one of enemy characters on the field, based on the operation input for the selection instruction. Then, when a first operation input (specifically, the operation input for the throwing motion instruction) is performed in a state where the enemy character is selected, the game system 1 causes a sub character to appear at the location where the selected enemy character is placed, and controls the command battle between the sub character and the selected enemy character. In addition, when a second operation input (specifically, the operation input for the target movement instruction) is performed in a state where the enemy character is selected, the game system 1 moves the sub character toward the selected enemy character on the field, and controls the automatic battle between the sub character and the selected enemy character. According to the above, by using the selection instruction, the player can easily designate enemy characters to be opponents in the command battle and the automatic battle. For example, even in a state where a plurality of enemy characters are placed close to each other on the field, the player can select one enemy character by the selection instruction and cause the sub character to perform the command battle or the automatic battle.

In the exemplary embodiment, the game system 1 controls the virtual camera such that the enemy character which is a selection target is displayed as an attention object at the center position of the screen, but the virtual camera may be controlled in any manner while the enemy character which is a selection target is being selected. For example, in other embodiments, the position and the direction of the virtual camera may be controlled in accordance with an operation input by the player while the enemy character which is a selection target is being selected, as in when the enemy character is not being selected. That is, the enemy character which is a selection target does not have to be constantly displayed at the center position of the screen, and does not have to be constantly displayed on the screen.

In other embodiments, the game system 1 may not necessarily accept the selection instruction, and even in the case of accepting the selection instruction, the game system 1 may not necessarily set the enemy character selected by the selection instruction, as the opponent in the command battle or the automatic battle.

In the exemplary embodiment, an upper limit may be set for the distance at which the command battle can be performed through the throwing motion instruction (i.e., the distance at which the ball thrown by the player character 201 can reach an enemy character). In addition, in the case where such an upper limit is set, in a state where the command battle can be performed through the throwing motion instruction (e.g., when an enemy character that is a selection target is located in the range where the ball thrown by the player character 201 can reach) while the selection instruction is being made, the game system 1 may display a notification image notifying the player that the command battle can be performed through the throwing motion instruction.

Similar to the above, an upper limit may be set for the distance at which the automatic battle can be performed through the target movement instruction (i.e., the distance by which the sub character moves away from the player character 201). In addition, in the case where such an upper limit is set, in a state where the automatic battle can be performed through the target movement instruction (e.g., when an enemy character that is a selection target is located in the range where the sub character is movable) while the selection instruction is being made, the game system 1 may display a notification image notifying the player that the automatic battle can be performed through the target movement instruction.

In the exemplary embodiment, when the distance between the player character 201 and an enemy character that is a selection target becomes equal to or larger than a predetermined distance, the game system 1 ends the process of controlling the virtual camera with the enemy character as the selection target, regardless of whether or not the selection instruction is being made. For example, the above predetermined distance may be set to a distance larger than the distance by which the player character 201 can throw a ball through a throwing motion.

3. Specific Example of Processing in Game System

Next, a specific example of information processing in the game system 1 will be described with reference to FIG. 17 to FIG. 22.

Figure 17:
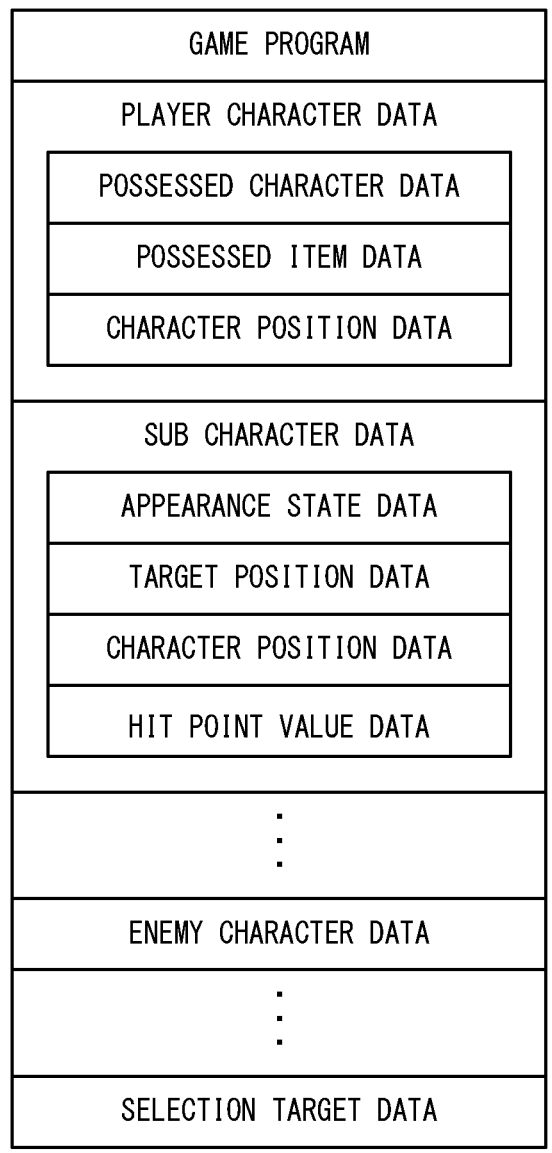
FIG. 17 is a diagram showing an example of various types of data used for information processing in a non-limiting game system.

FIG. 17 is a diagram showing an example of various types of data used for information processing in the game system 1. The various types of data shown in FIG. 17 are stored in a storage medium (e.g., the flash memory 84, the DRAM 85, and/or the memory card attached to the slot 23) accessible by the main body apparatus 2.

As shown in FIG. 17, the game system 1 stores therein a game program. The game program is a game program for executing the game processing (specifically, each process shown in FIG. 18 to FIG. 22) in the exemplary embodiment.

The game system 1 also stores therein player character data, sub character data, enemy character data, and selection target data.

The player character data indicates various types of information regarding a player character. In the exemplary embodiment, the player character data includes possessed character data, possessed item data, and character position data. The possessed character data indicates sub characters possessed by the player character (i.e., sub characters associated with balls possessed by the player character). In addition, the possessed item data indicates items possessed by the player character. Moreover, the character position data indicates the position of the player character on the field.

The sub character data indicates various types of information regarding the sub characters possessed by the player character. The sub character data is stored for each sub character possessed by the player character. In the exemplary embodiment, the sub character data includes appearance state data, target position data, character position data, and hit point value data. The appearance state data indicates whether or not the sub character is in an appearance state where the sub character appears on the field. The target position data indicates the above target position which is set for the sub character. In addition, the character position data indicates the position of the sub character on the field when the sub character is in the appearance state. The hit point value data indicates the current hit point value of the sub character. In addition to the above data, the sub character data includes data indicating various ability parameters (e.g., maximum hit point, attack power, defense power, quickness, etc.) regarding the sub character.

The enemy character data indicates various types of information regarding enemy characters to be placed on the field. The enemy character data is stored for each enemy character to be placed on the field. In the exemplary embodiment, the enemy character data includes data indicating various ability parameters regarding the enemy character. In addition, the enemy character data includes character position data indicating the position of the enemy character on the field.

The selection target data indicates an enemy character to be a selection target when the above-described selection instruction is being made.

Figure 18:
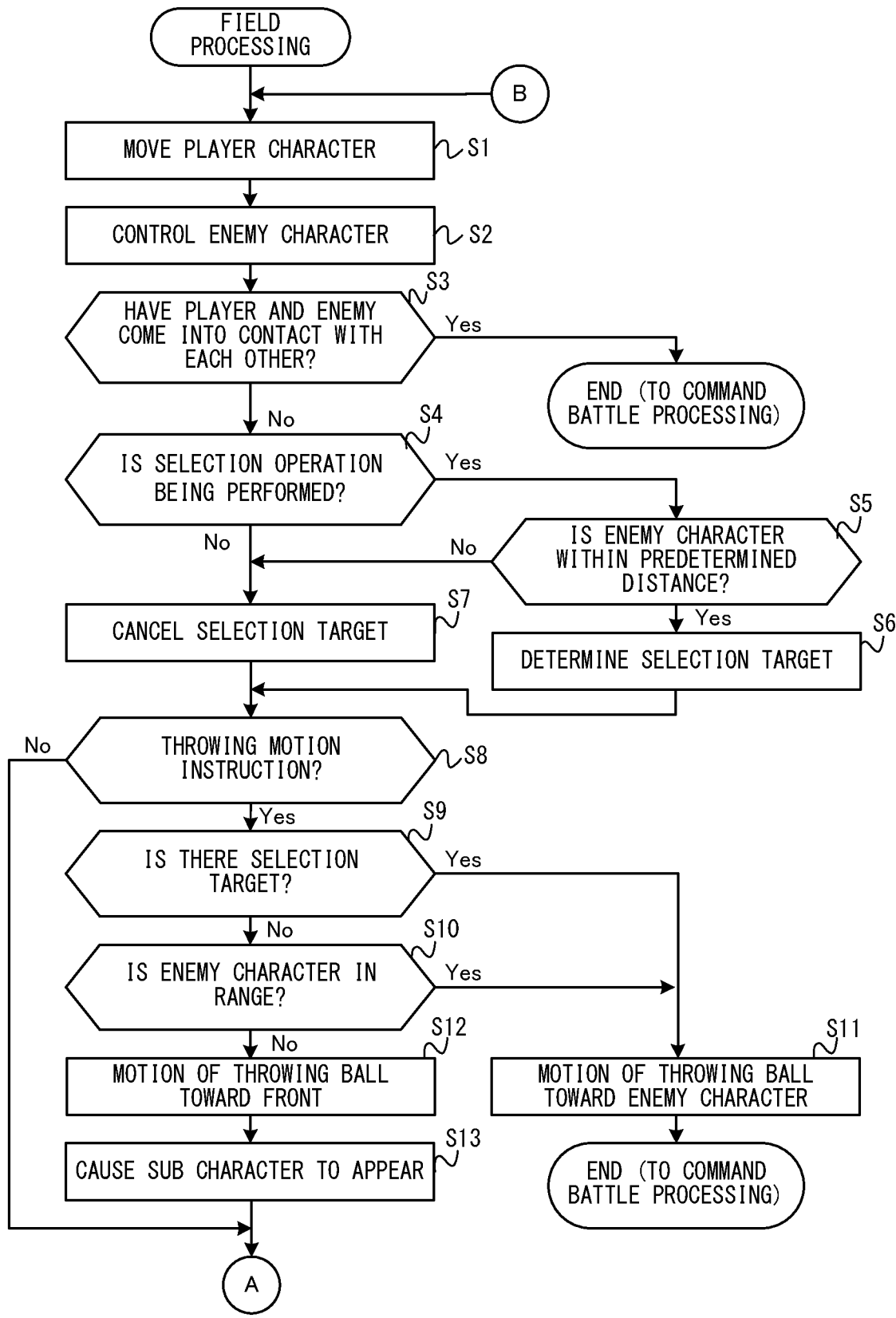
FIG. 18 is a flowchart showing an example of a flow of field processing executed by the non-limiting game system.
Figure 19:
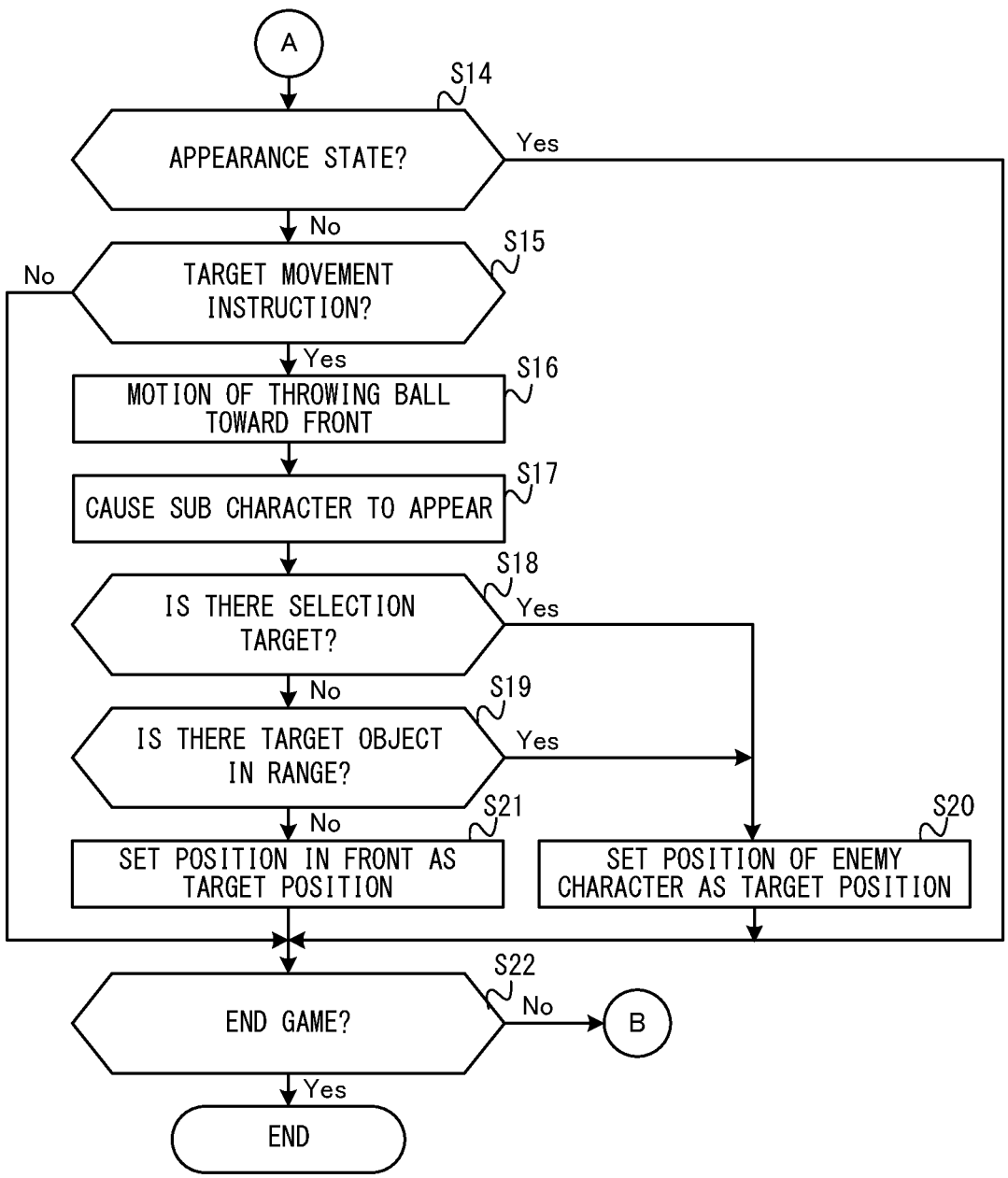
FIG. 19 is a flowchart showing an example of the flow of the field processing executed by the non-limiting game system.

FIG. 18 and FIG. 19 are flowcharts showing an example of a flow of field processing executed by the game system 1. The field processing is game processing executed in a scene in which the player character moves on the field during the game. During execution of the game program, the field processing is started, for example, when the player character appears on the field.

In the exemplary embodiment, the processor 81 of the main body apparatus 2 executes the game program stored in the game system 1 to execute processes in steps shown in FIGS. 18 to 22. However, in another embodiment, a part of the processes in the steps may be executed by a processor (e.g., a dedicated circuit or the like) other than the above processor. If the game system 1 is communicable with another information processing apparatus (e.g., a server), a part of the processes in the steps shown in FIGS. 18 to 22 may be executed by another information processing apparatus. The processes in the steps shown in FIGS. 18 to 22 are merely examples, and the processing order of the steps may be changed or another process may be executed in addition to (or instead of) the processes in the steps as long as similar results can be obtained.

The processor 81 executes the processes in the steps shown in FIGS. 18 to 22 by using a memory (e.g., the DRAM 85). That is, the processor 81 stores information (in other words, data) obtained in each process step, in the memory, and reads out the information from the memory when using the information for the subsequent process steps.

In step S1 shown in FIG. 18, the processor 81 moves the player character on the field, based on an operation input by the player. Specifically, the processor 81 acquires operation data received from each controller via the controller communication section 83 and/or the terminals 17 and 21, and determines a direction input for moving the player character, based on the acquired operation data. The processor 81 moves the player character, based on the determined direction input. At this time, the processor 81 updates the character position data included in the player character data stored in the memory, such that the character position data indicates the position after the movement. Next to step S1, a process in step S2 is executed.

In step S2, the processor 81 controls the movement of each enemy character placed on the field. That is, the processor 81 moves the enemy character according to an algorism defined in the game program. A specific movement mode of the enemy character is discretionary. The processor 81 updates the enemy character data stored in the memory, such that the enemy character data indicates the position after the movement. Next to step S2, a process in step S3 is executed.

In step S3, the processor 81 determines whether or not the player character and the enemy character have come into contact with each other on the field. This determination is performed based on the character position data included in the player character data stored in the memory and the character position data included in the enemy character data. When the determination result in step S3 is positive, the processor 81 ends the field processing. In this case, the processor 81 executes command battle processing (FIG. 22) described later. Accordingly, a command battle is started. On the other hand, when the determination result in step S3 is negative, a process in step S4 is executed.

In step S4, the processor 81 determines whether or not a selection operation is being performed by the player, based on the operation data. When the determination result in step S4 is positive, a process in step S5 is executed. On the other hand, when the determination result in step S4 is negative, the processes in steps S5 and S6 are skipped, and a process in step S7 is executed.

In step S5, the processor 81 determines whether or not any enemy character is placed within a predetermined distance from the player character. This determination is performed based on the character position data included in the player character data stored in the memory and the character position data included in the enemy character data. When the determination result in step S5 is positive, the process in step S6 is executed. On the other hand, when the determination result in step S5 is negative, the process in step S7 is executed.

In step S6, the processor 81 sets an enemy character to be a selection target, among the enemy characters placed within the predetermined distance from the player character. That is, the processor 81 sets an enemy character to be a selection target by the method described above in "2-4 Selection instruction", and stores data indicating this enemy character, as the selection target data in the memory. Next to step S6, a process in step S8 is executed.

In step S7, the processor 81 cancels the enemy character that is a selection target. That is, the processor 81 updates the selection target data stored in the memory, such that the selection target data indicates that no selection target is set. Next to step S7, the process in step S8 is executed.

In step S8, the processor 81 determines whether or not the throwing motion instruction has been performed by the player, based on the operation data. When the determination result in step S8 is positive, a process in step S9 is executed. On the other hand, when the determination result in step S8 is negative, the processes in steps S9 to S13 are skipped, and a process in step S14 is executed.

In step S9, the processor 81 determines whether or not there is an enemy character that is set as a selection target. This determination can be performed by referring to the selection target data stored in the memory. When the determination result in step S9 is positive, the process in step S11 is executed. On the other hand, when the determination result in step S9 is negative, the process in step S10 is executed.

In step S10, the processor 81 determines whether or not any enemy character is placed in the above determination range which is set based on the player character. That is, the processor 81 sets the determination range, based on the character position data included in the player character data stored in the memory, and performs the above determination, based on the set determination range and the position indicated by the character position data included in the enemy character data. When the determination result in step S10 is positive, the process in step S11 is executed. On the other hand, when the determination result in step S10 is negative, the process in step S12 is executed.

In step S11, the processor 81 controls the motion of the player character such that the player character throws a ball toward an enemy character. When there is an enemy character that is set as a selection target, the enemy character to which the ball is thrown is this enemy character, and when there is no enemy character that is set as a selection target, the enemy character to which the ball is thrown is the enemy character placed in the determination range. Through the process in step S11, the player character performs a motion of throwing the ball, and the ball is controlled so as to fly toward the enemy character. Then, when the ball hits the enemy character, the process in step S11 is ended, and the processor 81 executes the command battle processing (FIG. 22) described later. Accordingly, a command battle is started.

In step S12, the processor 81 controls the motion of the player character such that the player character throws a ball toward the front of the player character. Through the process in step S12, the player character performs a motion of throwing the ball, and the ball is controlled so as to fly toward the front of the player character. Then, when the ball drops onto the field, the process in step S12 is ended, and the process in step S13 is executed.

In step S13, the processor 81 causes a sub character to appear on the field. Specifically, among the sub characters possessed by the player character, the first sub character in the above-described order is placed on the field. At this time, the appearance state data included in the sub character data stored in the memory for the sub character is updated so as to indicate an appearance state, and the character position data included in the sub character data is updated so as to indicate the position at which the sub character has appeared. Next to step S13, the process in step S14 is executed.

In step S14 shown in FIG. 19, the processor 81 determines whether or not there is any sub character that is in an appearance state. This determination is performed based on the appearance state data included in the sub character data stored in the memory. When the determination result in step S14 is negative, a process in step S15 is executed. On the other hand, when the determination result in step S14 is positive, the processes in steps S15 to S21 are skipped, and a process in step S22 is executed.

In step S15, the processor 81 determines whether or not the target movement instruction has been performed by the player, based on the operation data. The determination process in step S15 is a process of determining whether or not the target movement instruction has been performed in a situation where no sub character has appeared on the field. When the determination result in step S15 is positive, the process in step S16 is executed. On the other hand, when the determination result in step S15 is negative, the processes in steps S16 to S21 are skipped, and the process in step S22 is executed.

In step S16, the processor 81 controls the motion of the player character such that the player character throws a ball toward the front of the player character. The process in step S16 is the same as the process in step S12. Through the process in step S16, the player character performs a motion of throwing the ball, and the ball is controlled so as to fly toward the front of the player character. Then, when the ball drops onto the field, the process in step S16 is ended, and the process in step S17 is executed.

In step S17, the processor 81 causes a sub character to appear on the field. The process in step S17 is the same as the process in step S13. Next to step S17, the process in step S18 is executed.

In step S18, as in the determination process in step S9, the processor 81 determines whether or not there is an enemy character that is set as a selection target (i.e., whether or not the selection operation is being performed). When the determination result in step S18 is positive, the process in step S20 is executed. On the other hand, when the determination result in step S18 is negative, the process in step S21 is executed.

In step S19, the processor 81 determines whether or not a target object (i.e., an enemy character or an item) is placed in the above determination range which is set based on the player character. That is, the processor 81 sets the determination range, based on the character position data included in the player character data stored in the memory, and performs the above determination, based on the set determination range and the positions of the enemy character and the item placed on the field. When the determination result in step S19 is positive, the process in step S20 is executed. On the other hand, when the determination result in step S19 is negative, the process in step S21 is executed.

In step S20, the processor 81 sets the position of the enemy character or the item as a target position for the sub character. Specifically, when there is an enemy character that is set as a selection target, the position of this enemy character is set as the target position, and when there is no enemy character that is set as a selection target, the position of the enemy character or item placed in the above determination range is set as the target position. At this time, the processor 81 updates the target position data included in the sub character data stored in the memory, such that the target position data indicates the target position set by the above process in step S20. Next to step S20, the process in step S22 is executed.

In step S21, the processor 81 sets a predetermined position in front of the player character, as a target position for the sub character. At this time, the processor 81 updates the target position data included in the sub character data stored in the memory, such that the target position data indicates the target position set by the above process in step S21. Next to step S21, the process in step S22 is executed.

As described above, when it is determined in step S15 that the target movement instruction has been performed, a ball is thrown by the process in step S16, and after a sub character appears on the field by the process in step S17, in sub character control processing (see FIG. 20 and FIG. 21) described later, the sub character is controlled so as to move toward the target position set in step S20 or S21.

During a series of the processes in steps S1 to S21, the processor 81 generates and displays a game image at appropriate timing (e.g., once in a one-frame time). Specifically, the processor 81 moves the virtual camera whose position and direction are set such that the player character is included in the field-of-view range thereof, in accordance with an operation of the player, and generates a game image showing the field viewed from the position of the virtual camera. At this time, based on the processes in steps S1, S2, S11 to S13, S16, and S17 and the result of the sub character control processing described later, the processor 81 generates a game image representing a state where each character performs motions corresponding to these processes. In addition, the processor 81 generates the game image such that the above-described state image 221 (see FIG. 10) and the marker image 224 (see FIG. 12) are included as appropriate. Moreover, while the selection instruction is being made by the player, the processor 81 controls the virtual camera so as to align the gaze point thereof with the enemy character to be a selection target, and generates the game image. The game image may be displayed on the display 12 of the main body apparatus 2, or may be displayed on another display device (e.g., the above-described stationary monitor). By repeatedly executing the above process of generating and displaying the game image, a state where each character (i.e., the player character, the sub character, and the enemy character) performs motions on the field is displayed on the display device.

In step S22, the processor 81 determines whether or not to end the game. For example, when an instruction to end the game has been performed by the player, the processor 81 determines to end the game. When the determination result in step S22 is negative, the process in step S1 is executed again. Thereafter, except when the determination result in step S3, S9, or S10 is positive, a series of the processes in steps S1 to S22 are repeatedly executed until it is determined in step S22 to end the game. On the other hand, when the determination result in step S22 is positive, the processor 81 ends the field processing shown in FIG. 18 and FIG. 19.

Figure 20:
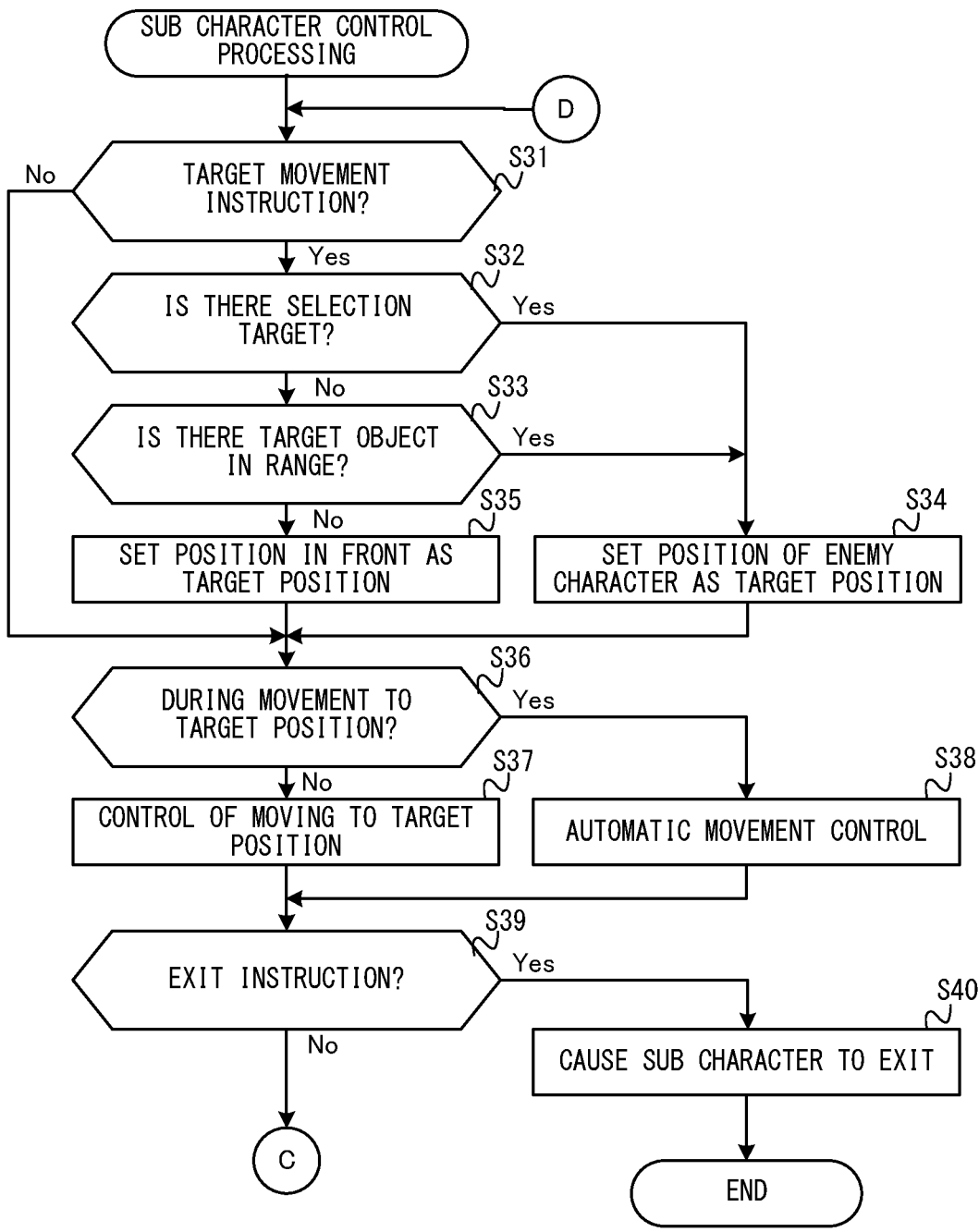
FIG. 20 is a sub flowchart showing an example of a flow of sub character control processing executed by the non-limiting game system.
Figure 21:
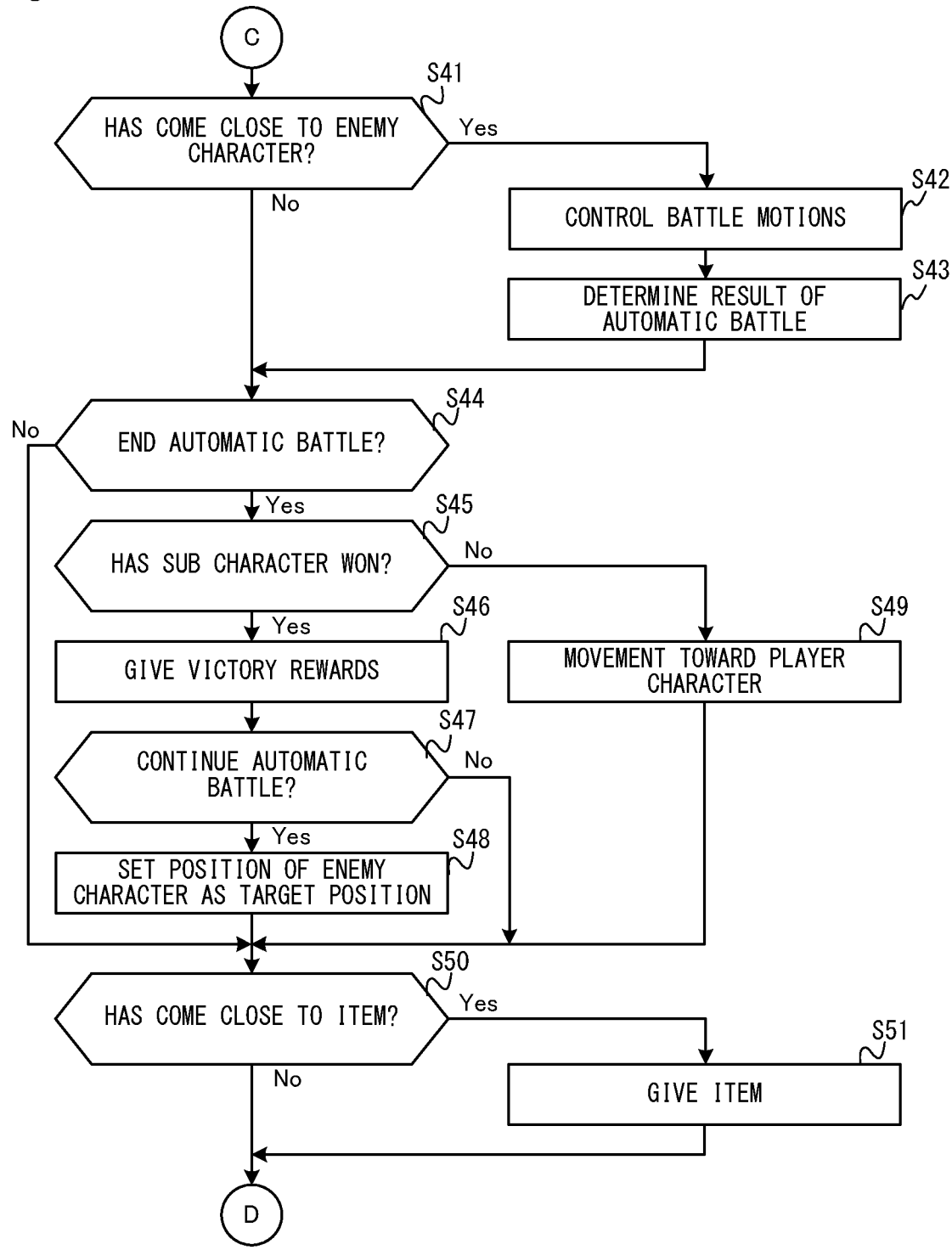
FIG. 21 is a sub flowchart showing an example of the flow of the sub character control processing executed by the non-limiting game system.

FIG. 20 and FIG. 21 are sub flowcharts showing an example of a flow of the sub character control processing. The sub character control processing is processing for controlling the motion of the sub character that has appeared on the field. The sub character control processing is started when the sub character appears on the field during the above field processing, and is executed in parallel with the field processing while the sub character is appearing on the field.

In the sub character control processing, first, in step S31, the processor 81 determines whether or not the target movement instruction has been performed by the player, based on the operation data. When the determination result in step S31 is positive, a process in step S32 is executed. On the other hand, when the determination result in step S31 is negative, the processes in steps S32 to S35 are skipped, and a process in step S36 is executed.

In step S32, the processor 81 determines whether or not there is an enemy character that is set as a selection target (i.e., whether or not the selection operation is being performed). The determination process in step S32 is performed in the same manner as the determination process in step S19. When the determination result in step S32 is positive, the process in step S34 is executed. On the other hand, when the determination result in step S32 is negative, the process in step S33 is executed.

In step S33, the processor 81 determines whether or not a target object (i.e., an enemy character or an item) is placed in the above determination range which is set based on the player character. The determination process in step S33 is performed in the same manner as the determination process in step S20. When the determination result in step S33 is positive, the process in step S34 is executed. On the other hand, when the determination result in step S33 is negative, the process in step S35 is executed.

In step S34, the processor 81 sets the position of the enemy character or the item as a target position for the sub character. The process in step S34 is the same as the process in step S21. Next to step S34, the process in step S36 is executed.

In step S35, the processor 81 sets a predetermined position in front of the player character, as a target position for the sub character. The process in step S35 is the same as the process in step S22. Next to step S35, the process in step S36 is executed.

In step S36, the processor 81 determines whether or not the sub character is moving toward the target position. This determination is performed based on the target position data included in the sub character data stored in the memory. Specifically, when a target position has been set for the sub character and the sub character has not reached the target position, it is determined that the sub character is moving toward the target position. On the other hand, when a target position has not been set for the sub character or the sub character has reached the target position, it is determined that the sub character is not moving toward the target position. When the determination result in step S36 is positive, a process in step S37 is executed. On the other hand, when the determination result in step S36 is negative, a process in step S38 is executed.

In step S37, the processor 81 performs control of moving the sub character toward the target position. That is, the processor 81 moves the sub character toward the position indicated by the target position data included in the sub character data stored in the memory for the sub character. At this time, the character position data included in the sub character data is updated so as to indicate the position of the sub character after the movement. In addition, when the sub character reaches the target position as a result of the process in step S37, the processor 81 updates the target position data such that the target position data indicates that no target position is set. Next to step S37, a process in step S39 is executed.

In step S38, the processor 81 performs control of automatically moving the sub character. That is, the processor 81 automatically moves the sub character according to an algorism defined in the game program. At this time, the character position data included in the sub character data is updated so as to indicate the position of the sub character after the movement. Next to step S38, the process in step S39 is executed.

In step S39, the processor 81 determines whether or not the exit instruction has been performed by the player, based on the operation data. When the determination result in step S39 is positive, a process in step S40 is executed. On the other hand, when the determination result in step S39 is negative, the process in step S40 is skipped, and a process in step S41 shown in FIG. 21 is executed.

In step S40, the processor 81 causes the sub character to exit the field. At this time, the processor 81 updates the appearance state data included in the sub character data stored in the memory, such that the appearance state data indicates a state where the sub character does not appear on the field. After step S40, the processor 81 ends the sub character control processing. In addition to when the process in step S40 is executed, when the field processing is ended, the processor 81 ends the sub character control processing.

In step S41 shown in FIG. 21, the processor 81 determines whether or not the sub character has come close to the enemy character corresponding to the set target position. This determination is performed by determining whether or not the enemy character is located in the action range of the sub character, based on the character position data included in the sub character data stored in the memory and the character position data included in the enemy character data. When the determination result in step S41 is positive, a process in step S42 is executed. On the other hand, when the determination result in step S39 is negative, the processes in steps S42 and S43 are skipped, and a process in step S44 is executed.

In step S42, the processor 81 causes the sub character and the enemy character to perform motions in an automatic battle. For example, the processor 81 controls the sub character and the enemy character such that each character performs a predetermined attack motion against the opponent character. Next to step S42, the process in step S43 is executed.

In step S43, the processor 81 determines a result (i.e., win or loss) of the automatic battle. Specifically, the processor 81 determines whether the sub character wins or losses, based on the data indicating the ability parameters and stored in the memory for the sub character and the enemy character that perform the automatic battle. In addition, the processor 81 calculates a hit point value, after the automatic battle, of each character, and updates, as necessary, the data indicating the hit point value for each of these characters and stored in the memory. Next to step S44, the process in step S44 is executed.

In step S44, the processor 81 determines whether or not to end the automatic battle. In the exemplary embodiment, the result of the automatic battle is determined at the start of the automatic battle by the process in step S43, but the automatic battle is ended after the battle motion of each character controlled by the process in step S42 is completed. Therefore, the processor 81 performs the determination in step S44 based on whether or not the battle motion of each of the characters has been completed. When the determination result in step S44 is positive, a process in step S45 is executed. On the other hand, when the determination result in step S44 is negative, the processes in steps S45 to S49 are skipped, and a process in step S50 is executed.

In step S45, the processor 81 determines whether or not the sub character has won the automatic battle, based on the process result in step S43. When the determination result in step S45 is positive, the process in step S46 is executed. On the other hand, when the determination result in step S45 is negative, the process in step S49 is executed.

In step S46, the processor 81 gives victory rewards to the player character and the sub character. Specifically, the processor 81 gives an item corresponding to the enemy character defeated in the automatic battle, to the player character, and gives an experience value having a magnitude corresponding to the enemy character, to the sub character. At this time, the processor 81 updates the player character data and the sub character data stored in the memory, such that the player character data and the sub character data indicate the contents after the giving. Next to step S46, the process in step S47 is executed.

In step S47, the processor 81 determines whether or not to cause the sub character to continuously perform the automatic battle. Specifically, the processor 81 determines whether or not any enemy character is placed in the action range based on the sub character. When the determination result in step S47 is positive, the process in step S48 is executed. On the other hand, when the determination result in step S47 is negative, the process in step S48 is skipped, and the process in step S50 is executed.

In step S48, the processor 81 sets the position of the enemy character placed in the action range, as a new target position. At this time, the processor 81 updates the target position data included in the sub character data stored in the memory, such that the target position data indicates the position of the enemy character. Accordingly, in step S41 executed next, it is determined that the sub character has come close to the enemy character, and the automatic battle between this enemy character and the sub character is performed. Next to step S48, the process in step S50 is executed.

In step S49, the processor 81 controls the sub character such that the sub character moves toward the player character. Specifically, the processor 81 sets a predetermined position in the vicinity of the player character, as a target position for the sub character. At this time, the target position data included in the sub character data stored in the memory is updated so as to indicate the predetermined position. Accordingly, through the process in step S37 executed later, the sub character moves toward the player character. Next to step S49, the process in step S50 is executed.

In step S50, the processor 81 determines whether or not the sub character has come close to an item corresponding to the set target position. This determination is performed by determining whether or not the item is located in the action range of the sub character, based on the character position data included in the sub character data stored in the memory and the data indicating the position of the item placed on the field. When the determination result in step S50 is positive, a process in step SM is executed. On the other hand, when the determination result in step S50 is negative, the process in step S31 is executed again.

In step S51, the processor 81 gives the item located near the sub character, to the player character. Specifically, the processor 81 deletes the item from the field, and updates the player character data stored in the memory, such that the player character data has a content of possessing the item. In step S51, the processor 81 executes a process of deleting the item from the field, and a process of giving the item to the player character may be executed at later timing (e.g., timing at which the sub character comes close to the player character, or timing at which the sub character exits the field). After step S51, the process in step S31 is executed again.

Figure 22:
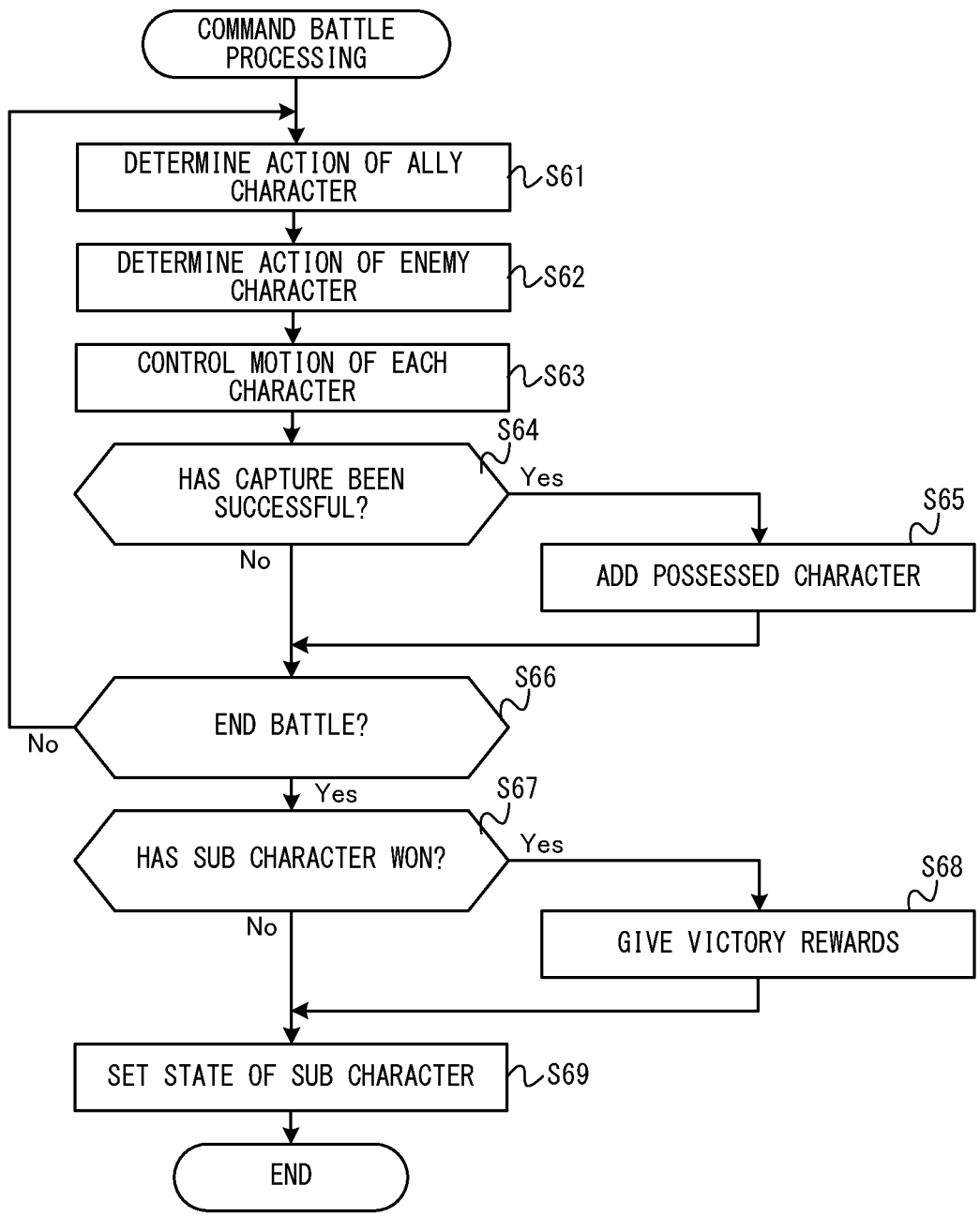
FIG. 22 is a flowchart showing an example of a flow of command battle processing executed by the non-limiting game system.

FIG. 22 is a flowchart showing an example of a flow of the command battle processing executed by the game system 1. The command battle processing is game processing executed when a command battle is performed during the game. The command battle processing is started when the field processing is ended as a result of the determination result in step S3 or S13 in the field processing being positive.

In the command battle processing shown in FIG. 22, in one turn in the command battle, in a process loop of steps S61 to S66 are executed once, and when the turn is repeated in the command battle, the process loop of steps S61 to S66 is repeatedly executed. In addition, although not shown in FIG. 22, the processor 81 generates and displays a game image at appropriate timing in a series of processes in steps S61 to S66. Accordingly, a game image as shown in FIG. 9 is displayed, or an animation in which each character performs an attack motion is displayed by updating the game image.

In step S61 shown in FIG. 22, the processor 81 determines an action of an ally character (i.e., the player character and the sub character). That is, the processor 81 displays a game image including the above-described command images (see FIG. 9), and accepts an operation input for designating a command. The processor 81 acquires operation data received from each controller via the controller communication section 83 and/or the terminals 17 and 21, and specifies the command designated by the player, based on the acquired operation data. The processor 81 determines an action corresponding to the specified command, as an action to be performed by the ally character. Next to step S61, the process in step S62 is executed.

In step S62, the processor 81 determines an action of the enemy character. That is, the processor 81 determines an action to be performed by the enemy character, according to an algorism defined in the game program. Next to step S62, the process in step S63 is executed.

In step S63, the processor 81 controls the motion of each character (i.e., the player character, the sub character, and the enemy character) based on the actions determined in steps S61 and S62. In the exemplary embodiment, the processor 81 determines an action order of each character according to a rule defined in the game program, and causes each character to sequentially perform the action according to the determined action order. In addition, when a character performs an attack motion to attack another character, the processor 81 calculates the damage received by the other character, and changes the hit point value of the other character. Next to step S63, the process in step S64 is executed.

In step S64, the processor 81 determines whether or not the enemy character has been successfully captured. That is, when the player character is determined in step S61 to perform capture, in step S63, the player character performs a motion of capturing the enemy character, and whether the capture is successful or unsuccessful is determined. In step S64, whether or not the capture has been successful is determined. When the determination result in step S64 is positive, the process in step S65 is executed. On the other hand, when the determination result in step S64 is negative, the process in step S65 is skipped, and the process in step S66 is executed.

In step S65, the processor 81 adds the successfully captured enemy character as a sub character possessed by the player character. At this time, the processor 81 updates the possessed character data stored in the memory, such that the possessed character data has a content of including the successfully captured enemy character. Next to step S65, the process in step S66 is executed.

In step S66, the processor 81 determines whether or not to end the command battle. For example, when any one condition of (a) the hit point of the enemy character reaches 0 or is captured, (b) the hit point of the sub character reaches 0, and (c) the player character successfully escapes from the command battle, is satisfied, the processor 81 determines to end the command battle. On the other hand, when none of the above conditions are satisfied, the processor 81 determines not to end the command battle. When the determination result in step S66 is positive, a process in step S67 is executed. On the other hand, when the determination result in step S66 is negative, the process in step S61 is executed again. Thereafter, the turn in the command battle is repeated by repeatedly executing the process loop of steps S61 to S66 until it is determined in step S66 to end the command battle.

In step S67, the processor 81 determines whether or not the sub character has won the command battle. Specifically, when the command battle has ended as a result of the above condition (a) being satisfied, the processor 81 determines that the sub character has won. On the other hand, when the command battle has ended as a result of the above condition (b) or (c) being satisfied, the processor 81 determines that the sub character has not won. When the determination result in step S67 is positive, a process in step S68 is executed. On the other hand, when the determination result in step S67 is negative, a process in step S69 is executed.

In step S68, the processor 81 gives victory rewards to the player character and the sub character. The process in step S68 is the same as the process in step S46. However, in the exemplary embodiment, in the process in step S68, the processor 81 gives a higher experience value than that when the process in step S46 is executed, to the sub character when wining against the same enemy character. Next to step S68, the process in step S69 is executed.

In step S69, the processor 81 sets the state of the sub character after the command battle. Specifically, when the sub character has lost in the command battle, the processor 81 set the sub character to be in a state where the sub character has exited the field, and in other cases (i.e., when the sub character has won the command battle or when the battle has ended as a result of the player character escaping from the command battle), the processor 81 sets the sub character to be in an appearance state. The processor 81 updates the appearance state data included in the sub character data stored in the memory, such that the appearance state data indicates the content after the setting. After step S69, the processor 81 ends the command battle processing. After the end of the command battle processing, the above-described field processing is executed, and when a sub character is placed on the field, the sub character control processing is also executed.

4. Function and Effect of the Exemplary Embodiment, and Modifications

As described above, in the exemplary embodiment, the game program is configured to cause a computer of an information processing apparatus (the main body apparatus 2 as an example) to execute the following processes.

Process of moving a player character on a field in a virtual space, based on a movement operation input (step S1).

Process of performing control of causing a sub character to appear on the field, based on a first operation input (as an example, the operation input for the throwing motion instruction) (step S13 in the field processing, or the command battle processing), and (a) when an enemy character is placed at a location where the sub character is caused to appear, controlling a battle (as an example, the above command battle) between the sub character and the enemy character by a first mode in which the battle proceeds based on an operation input (step S63), and (b) when the enemy character is not placed at the location where the sub character is caused to appear, starting automatic control of automatically moving the sub character that has appeared (step S38).

Process of performing control of moving the sub character in a predetermined direction on the field, based on a second operation input (step S37), and, when the enemy character is placed at a location of a designation, controlling a battle (as an example, the above automatic battle) between the sub character and the enemy character by a second mode in which the battle automatically proceeds (step S42).

According to the above configuration, the player can perform two types of battles, that is, a battle by the first mode and a battle by the second mode. In addition, according to the above configuration, since the player can selectively perform a battle by the first mode in which the player performs an operation input, and a battle by the simpler second mode, for example, the player can perform a battle according to a game situation or their preferences, and can comfortably progress the game.

The "location where the sub character is caused to appear" refers to a range including a position at which the sub character is placed when the sub character appears (e.g., may be the above-described determination range or a range within a predetermined distance from this position). Therefore, the "when an enemy character is placed at a location where the sub character is caused to appear" means to include the case where the enemy character is placed near the position at which the sub character is placed when the sub character appears.

The "control of moving the sub character on the field in a predetermined direction, based on a second operation input" may mean control of designating a position of a designation of the sub character (e.g., the above-described target position) by the second operation input (can be regarded as designating a direction from the current position of the sub character to the position of the designation by the second operation input), or may mean control of designating a movement direction of the sub character by the second operation input.

The battle by the first mode means to include a battle by a discretionary mode in which the battle proceeds based on an operation input by the player. In the above embodiment, the command battle in which the player designates a command is described as a specific example of the battle by the first mode, but the battle by the first mode is not limited to the command battle. For example, in other embodiments, as the battle by the first mode, a battle in which a character moves on a battle field in response to a direction input or a character performs an attack motion or a jump motion in response to a predetermined button input, may be performed.

In the exemplary embodiment, when a process is executed by using data (including a program) in a certain information processing apparatus, a part of the data required for the process may be transmitted from another information processing apparatus different from the certain information processing apparatus. In this case, the certain information processing apparatus may execute the process by using the data received from the other information processing apparatus and the data stored therein.

In other embodiments, the information processing system may not include some of the components in the above embodiment, and may not execute some of the processes executed in the above embodiment. For example, in order to achieve a specific effect of a part of the above embodiment, the information processing system only needs to include a configuration for achieving the effect and execute a process for achieving the effect, and need not include other configurations and need not execute other processes.

The exemplary embodiment can be used as, for example, a game system or a game program, in order to, for example, perform a battle in a game by a plurality of methods.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein a game program,
    the game program causing a processor of an information processing apparatus to execute:
        performing control of moving a player character on a field in a virtual space, based on a movement operation input;
        performing control of causing a sub character to appear on the field, based on a first operation input, and when an enemy character is placed at a location where the sub character is caused to appear, controlling a battle between the sub character and the enemy character by a first mode in which the battle proceeds based on an operation input, and when the enemy character is not placed at the location where the sub character is caused to appear, starting automatic control of automatically moving the sub character that has appeared; and
        performing control of moving the sub character in a predetermined direction on the field, based on a second operation input, and, when the enemy character is placed at a location of a designation, controlling a battle between the sub character and the enemy character by a second mode in which the battle automatically proceeds.

2. The storage medium according to claim 1, wherein the game program further causes the processor to start the automatic control after the battle by the second mode ends.

3. The storage medium according to claim 2, wherein the game program further causes the processor to, if another enemy character is placed in a predetermined range including a position of the sub character when the battle between the sub character and the enemy character by the second mode ends, start a battle between the sub character and the other enemy character by the second mode.

4. The storage medium according to claim 3, wherein the automatic control includes movement control of causing the sub character to follow the player character.

5. The storage medium according to claim 1, wherein the game program further causes the processor to perform control of bringing the sub character into a state where the sub character has not appeared on the field, when a third operation input is performed in a state where the sub character has appeared.

6. The storage medium according to claim 1, wherein the game program further causes the processor to, when the player character comes into contact with the enemy character, control a battle between the sub character and the enemy character by the first mode regardless of whether or not the sub character has appeared on the field.

7. The storage medium according to claim 1, wherein the game program causes the processor to perform control of moving the sub character toward a predetermined position set in front of the player character, when the second operation input is performed.

8. The storage medium according to claim 7, wherein the game program causes the processor to perform control of causing the sub character to appear on the field and moving the sub character toward the predetermined position, when the second operation input is performed in a state where the sub character has not appeared on the field.

9. The storage medium according to claim 1, wherein the game program further causes the processor to:
    select one of enemy characters on the field, based on a fourth operation input;
    when the first operation input is performed in a state where the enemy character is selected, perform control of causing the sub character to appear at a location where the selected enemy character is placed, and control a battle between the sub character and the selected enemy character by the first mode; and
    when the second operation input is performed in a state where the enemy character is selected, perform control of moving the sub character toward the selected enemy character on the field, and control a battle between the sub character and the selected enemy character by the second mode.

10. The storage medium according to claim 1, wherein, in a battle by the first mode, a plurality of commands including at least an attack by the sub character on the enemy character and capture of the enemy character are designated based on an operation input, and motions of the player character and/or the sub character corresponding to the designated commands are executed.

11. The storage medium according to claim 10, wherein a battle by the first mode is started after display control of moving a viewpoint such that the sub character and the enemy character that perform the battle are included at least in a field of view, without switching a scene on the field, and movement of the player character is limited during the battle.

12. The storage medium according to claim 11, wherein a battle by the second mode is started without switching the scene on the field, and movement control of the player character based on the movement operation input is executed during the battle.

13. An information processing system comprising at least one information processing apparatus including a processor,
at least any one processor of said at least one information processing apparatus:
moving a player character on a field in a virtual space, based on a movement operation input;
causing a sub character to appear on the field, based on a first operation input, and
when an enemy character is placed at a location where the sub character is caused to appear, controlling a battle between the sub character and the enemy character by a first mode in which the battle proceeds based on an operation input, and
when the enemy character is not placed at the location where the sub character is caused to appear, starting automatic control of automatically moving the sub character that has appeared; and
moving the sub character in a predetermined direction on the field, based on a second operation input, and, when the enemy character is placed at a location of a designation, controlling a battle between the sub character and the enemy character by a second mode in which the battle automatically proceeds.

14. The information processing system according to claim 13, wherein said at least any one processor starts the automatic control after the battle by the second mode ends.

15. The information processing system according to claim 14, wherein, if another enemy character is placed in a predetermined range including a position of the sub character when the battle between the sub character and the enemy character by the second mode ends, said at least any one processor starts a battle between the sub character and the other enemy character by the second mode.

16. The information processing system according to claim 15, wherein the automatic control includes movement control of causing the sub character to follow the player character.

17. The information processing system according to claim 13, wherein, when a third operation input is performed in a state where the sub character has appeared, said at least any one processor perform control of bringing the sub character into a state where the sub character has not appeared on the field.

18. The information processing system according to claim 13, wherein when the player character comes into contact with the enemy character, said at least any one processor controls a battle between the sub character and the enemy character by the first mode regardless of whether or not the sub character has appeared on the field.

19. The information processing system according to claim 13, wherein, when the second operation input is performed, said at least any one processor moves the sub character toward a predetermined position set in front of the player character.

20. The information processing system according to claim 19, wherein, when the second operation input is performed in a state where the sub character has not appeared on the field, said at least any one processor causes the sub character to appear on the field and moves the sub character toward the predetermined position.

21. The information processing system according to claim 13, wherein said at least any one processor:
selects one of enemy characters on the field, based on a fourth operation input;
when the first operation input is performed in a state where the enemy character is selected, causes the sub character to appear at a location where the selected enemy character is placed, and controls a battle between the sub character and the selected enemy character by the first mode; and
when the second operation input is performed in a state where the enemy character is selected, moves the sub character toward the selected enemy character on the field, and controls a battle between the sub character and the selected enemy character by the second mode.

22. The information processing system according to claim 13, wherein, in a battle by the first mode, a plurality of commands including at least an attack by the sub character on the enemy character and capture of the enemy character are designated based on an operation input, and motions of the player character and/or the sub character corresponding to the designated commands are executed.

23. The information processing system according to claim 22, wherein a battle by the first mode is started after display control of moving a viewpoint such that the sub character and the enemy character that perform the battle are included at least in a field of view, without switching a scene on the field, and movement of the player character is limited during the battle.

24. The information processing system according to claim 23, wherein a battle by the second mode is started without switching the scene on the field, and movement control of the player character based on the movement operation input is executed during the battle.

25. An information processing apparatus comprising a processor,
the processor:
moving a player character on a field in a virtual space, based on a movement operation input;
causing a sub character to appear on the field, based on a first operation input, and
when an enemy character is placed at a location where the sub character is caused to appear, controlling a battle between the sub character and the enemy character by a first mode in which the battle proceeds based on an operation input, and
when the enemy character is not placed at the location where the sub character is caused to appear, starting automatic control of automatically moving the sub character that has appeared; and
moving the sub character in a predetermined direction on the field, based on a second operation input, and, when the enemy character is placed at a location of a designation, controlling a battle between the sub character and the enemy character by a second mode in which the battle automatically proceeds.

26. A game processing method executed by an information processing system, the information processing system:

moving a player character on a field in a virtual space, based on a movement operation input;

causing a sub character to appear on the field, based on a first operation input, and when an enemy character is placed at a location where the sub character is caused to appear, controlling a battle between the sub character and the enemy character by a first mode in which the battle proceeds based on an operation input, and when the enemy character is not placed at the location where the sub character is caused to appear, starting automatic control of automatically moving the sub character that has appeared; and moving the sub character in a predetermined direction on the field, based on a second operation input, and, when the enemy character is placed at a location of a designation, controlling a battle between the sub character and the enemy character by a second mode in which the battle automatically proceeds.

* * * * *